United States Patent
Matis et al.

(10) Patent No.: US 12,110,376 B2
(45) Date of Patent: Oct. 8, 2024

(54) SOFT MATTER HAVING AN ANDERSON TRANSITION TO A LOCALIZED PHASE

(71) Applicant: The Government of the United States of America, as represented by the Secretary of the Navy, Arlington, VA (US)

(72) Inventors: Bernard R. Matis, Alexandria, VA (US); Nicholas T. Gangemi, Washington, DC (US); Jeffrey W. Baldwin, Fairfax, VA (US); Steven W. Liskey, Odenton, MD (US); Aaron D. Edmunds, Alexandria, VA (US); William B. Wilson, Pasadena, MD (US); Douglas M. Photiadis, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 522 days.

(21) Appl. No.: 17/583,697

(22) Filed: Jan. 25, 2022

(65) Prior Publication Data
US 2022/0251322 A1    Aug. 11, 2022

Related U.S. Application Data

(60) Provisional application No. 63/141,175, filed on Jan. 25, 2021.

(51) Int. Cl.
*C08J 3/075*    (2006.01)
*C08J 9/236*    (2006.01)
(Continued)

(52) U.S. Cl.
CPC .............. *C08J 9/236* (2013.01); *C08J 3/075* (2013.01); *C08J 2203/22* (2013.01);
(Continued)

(58) Field of Classification Search
CPC ........ C08J 9/236; C08J 3/075; C08J 2205/02; C08J 2300/06; C08J 2203/22;
(Continued)

(56) References Cited

U.S. PATENT DOCUMENTS

2002/0193878 A1* 12/2002 Bowman .................. A61F 2/52
                                                        623/7
2005/0080151 A1*  4/2005 Miki ......................... C08J 9/32
                                                        521/50
(Continued)

OTHER PUBLICATIONS

Nouryon. "Product Specification Expancel Microspheres—Expancel DE". Feb. 2019. (Year: 2019).*
(Continued)

*Primary Examiner* — Michael M Dollinger
*Assistant Examiner* — Christina H. W. Rosebach
(74) *Attorney, Agent, or Firm* — US Naval Research Laboratory; Joseph T. Grunkemeyer

(57) ABSTRACT

An article having: an elastomeric jacket; a gel within the jacket; and a plurality of gas-filled, polymerically-encapsulated microbubbles suspended in the gel. The microbubbles have a Gaussian particle size distribution. The largest microbubble has a diameter at least 10 times the diameter of (Continued)

the smallest microbubble. The article may exhibit Anderson localization at at least one frequency of sound waves impacting the article.

21 Claims, 28 Drawing Sheets

(51) Int. Cl.
    *G01N 29/032* (2006.01)
    *G01N 29/036* (2006.01)
(52) U.S. Cl.
    CPC ........ *C08J 2205/02* (2013.01); *C08J 2300/26* (2013.01); *G01N 29/032* (2013.01); *G01N 29/036* (2013.01); *G01N 2291/02433* (2013.01)
(58) Field of Classification Search
    CPC ............... G01N 29/032; G01N 29/036; G01N 2291/02433; B32B 20/00–23; B32B 2266/12–124; B32B 2319/00; A61F 2/12
    See application file for complete search history.

(56) References Cited

U.S. PATENT DOCUMENTS

2009/0299473 A1\* 12/2009 Govrin-Yehudian ..... A61F 2/12
                                                            623/8
2019/0359786 A1\* 11/2019 Trahan .................... B01F 35/92

OTHER PUBLICATIONS

Matis, B.R. et al. Critical Role of a Nanometer-Scale Microballoon Shell on Bulk Acoustic Properties of Doped Soft Matter. Langmuir 2020, 36, 5787-5792. (Year: 2020).\*
Chen et al., Wave scattering from encapsulated microbubbles subject to high-frequency ultrasound: contribution of higher-order scattering modes. J. Acoust. Soc. Am. 126, 1766-1775 (2009).
Khismatullin, Resonance frequency of microbubbles: effect of viscosity. J. Acoust. Soc. Am. 116, 1463-1473 (2004).
Khismatullin et al., Radial oscillations of encapsulated microbubbles in viscoelastic liquids. Phys. Fluids 14, 3534-3557 (2002).
Matis et al., Observation of a transition to a localized ultrasonic phase in soft matter. Comm. Phys. (2022) 5:21.

\* cited by examiner

SOFT MATTER HAVING AN ANDERSON TRANSITION TO A LOCALIZED PHASE

This application claims the benefit of U.S. Provisional Application No. 63/141,175, filed on Jan. 25, 2021. The provisional application and all other publications and patent documents referred to throughout this nonprovisional application are incorporated herein by reference.

TECHNICAL FIELD

The present disclosure is generally related to materials exhibiting an Anderson transition.

DESCRIPTION OF RELATED ART

For strongly disordered three-dimensional (3D) systems the Anderson transition has been expected to separate phases comprised of extended and localized states [1-6]. Early theoretical studies based on either scaling arguments derived from perturbative expansions [3] or on renormalization group in 2+ε dimensions [7,8] predicted a mobility edge in 3D (the energy at which the transition from localized to extended behavior occurs). The theoretical predictions are based on analyses of single particle wavefunctions of disordered systems and are thus applicable to both quantum mechanical (single particle) and classical waves. However, predictive capabilities in 3D are still incomplete with the most powerful theoretical tool available, the supersymmetric sigma model [9], unable to make predictions at the mobility edge [6]. Experimental comparisons with theory are (and have been) inevitably incomplete, but have begun to help develop a more sound understanding of the phase transition associated with the localized phase.

Experiments seeking to observe single-particle quantum effects induced by disorder are complicated by a number of physical phenomena. Obtaining comparisons between theory and experiment in the electronic case, for which the theory was originally intended, is greatly complicated by the Coulomb interaction between electrons [6, 10-14], and substantial modifications of the theory are needed to compare with experiment. As a result, researchers have shifted their focus to systems enabling the study of non-interacting, single-particle wavefunctions.

Studies on the expansion dynamics of atomic matter waves in a disordered potential defined by a laser speckle field circumvent the issues associated with interparticle interactions and have led to the observation of localization effects in 3D [15-17]. However, results of these matter wave experiments are complicated by certain experimental factors including the range of energy states that exist within the expanding wavepacket (diffusive and localized states), the long experimental timescales required, and subtleties in the random distributions (including anisotropic correlations within the disordered potentials and the nature of the quasi-periodic potential). These experimental complications have led to significant differences between measured values of the mobility edge and numerical predictions [18], and these differences are still not well understood. Additionally, no matter wave experiment has thus far demonstrated an energy distribution narrow enough to determine the phase transition's critical exponents or multifractal behavior [17, 18]. Studies on dynamical wave localization where the wavefunction is exponentially attenuated in momentum space show promise for determining the phase transition's critical exponents [19]; however, these experiments are not a real space realization of the Anderson localization of wave energy by disorder and do not address the question of Anderson localization in systems with topological disorder.

It was long expected that studying classical waves would provide a straightforward path to observe localization effects in non-interacting systems and a means for comparing experiment directly to theory. Further, experiments aimed at studying classical wave propagation through a disordered medium can circumvent the challenges associated with a Bose-Einstein condensate expansion measurement owing to the long times over which energy can be measured and the possibility of separating diffusive from localized effects in frequency domain, which could lead to measurable localization effects that are not skewed by the presence of delocalized states as in the case for matter waves. In the classical case, instead of a single mobility edge (as in the electronic case) there is expected to be a second, low-frequency mobility edge driven by Rayleigh scattering, which is a phenomenon that does not occur in quantum systems; the difference results from the different boundary conditions, which lead to the different scattering phenomena at low energies and frequencies [20]. Thus, one expects in the classical case to observe a disorder-driven band of localized states at intermediate frequencies, separated from extended states at low and high frequencies by two mobility edges [8, 20-22]. Experimental observation of such a localized phase, however, has proven to be elusive.

The difficulty in observing a localized phase for a classical wave system in 3D is due in large part to the difficulty in achieving strong enough scattering with small dissipation. In studies on light scattering, observation of a phase transition has been difficult with several early claims of light localization [23, 24] being disputed [25]. In parallel studies, investigators have examined resonant mesoglass systems and have observed localization effects in narrow frequency bands near resonance [26-28]. This is indeed a significant finding, but it is not the observation of a broad frequency band of localized states that one may fairly interpret as a localized phase, as originally envisioned.

BRIEF SUMMARY

Disclosed herein is an article comprising: an elastomeric jacket; a gel within the jacket; and a plurality of gas-filled, polymerically-encapsulated microbubbles suspended in the gel. The microbubbles have a Gaussian particle size distribution. The largest microbubble has a diameter at least 10 times the diameter of the smallest microbubble.

BRIEF DESCRIPTION OF THE DRAWINGS

A more complete appreciation will be readily obtained by reference to the following Description of the Example Embodiments and the accompanying drawings.

Figure 22:
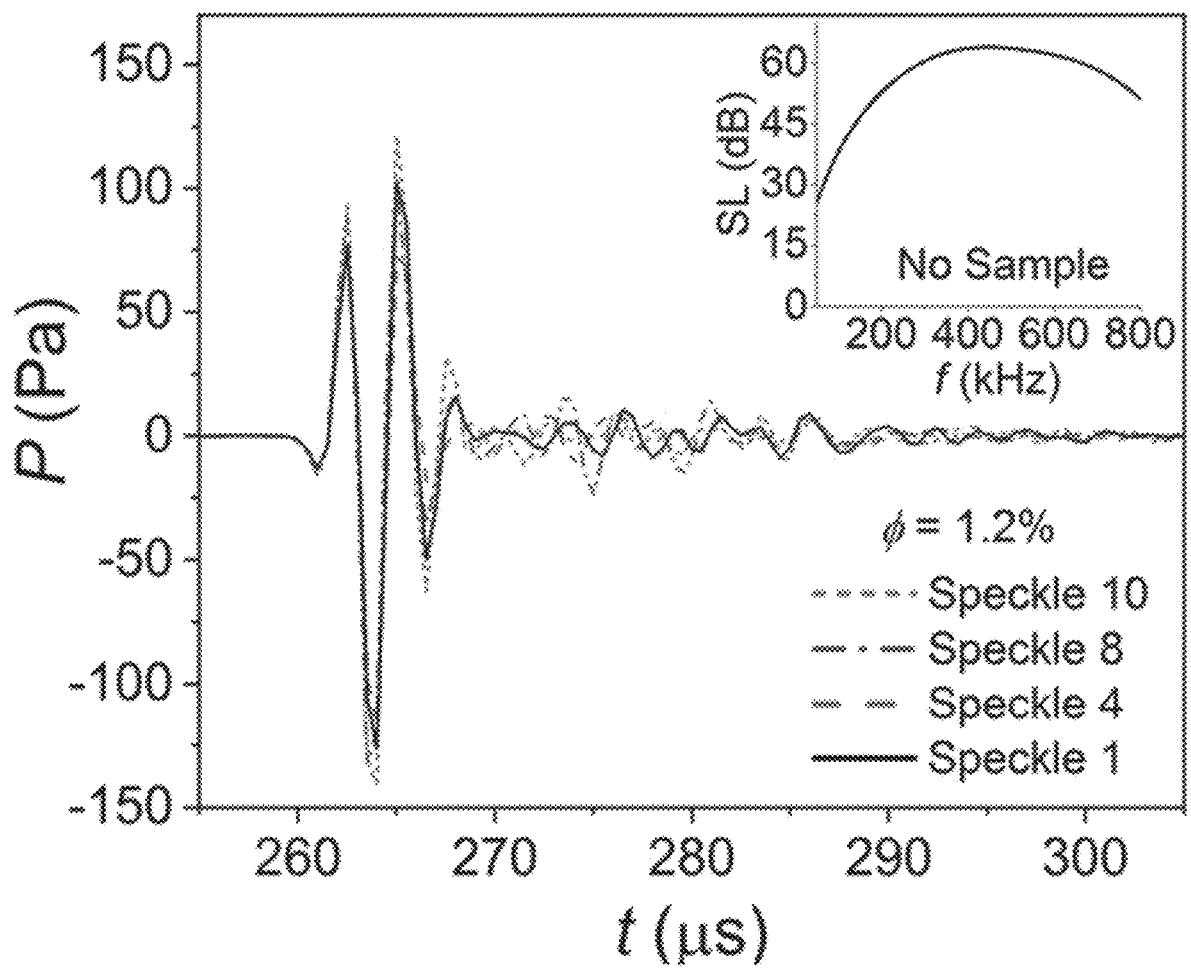
FIG. 22 shows pressure P versus time t for $\phi=1.2\%$ measured in different speckles. The incident wavepacket is based on a Gaussian first derivative, which provides a narrow impulse. The coherent pressure field is observable for 260 μs<t<268 μs, and is followed by the incoherent field. Inset: measured frequency spectrum of the incident wavepacket.
Figure 23:
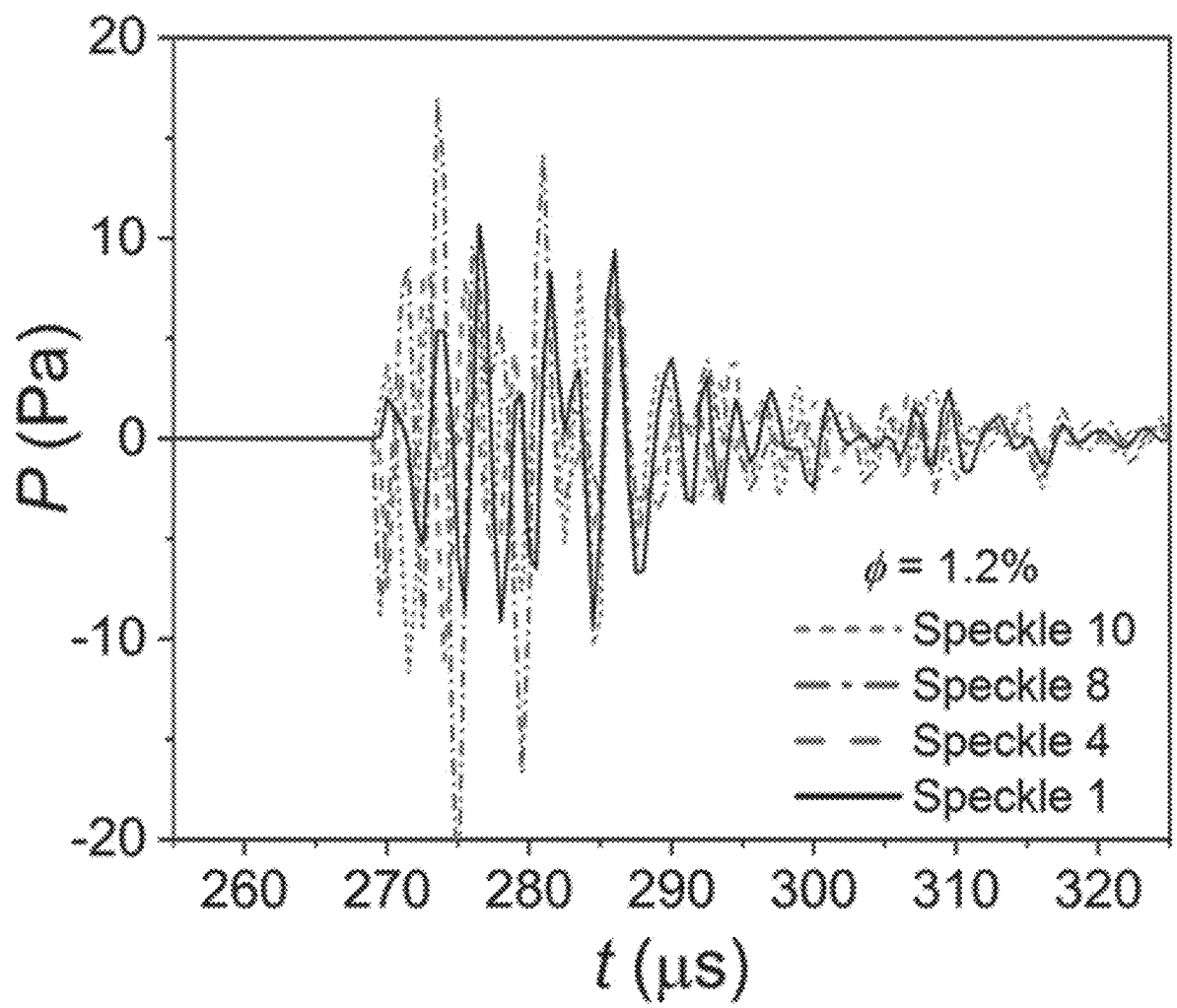
FIG. 23 shows incoherent pressure field after time-windowing the data shown in FIG. 22.

24. The solid line is a fit to the self-consistent theory (SCT) of localization. Note, the time range in FIGS. 22 and 23 is the experiment time while in FIGS. 24 and 25 the time range has been shifted so the maximum in $I/I_O$ for the incoherent field occurs shortly after t=0 s.

Figure 26:
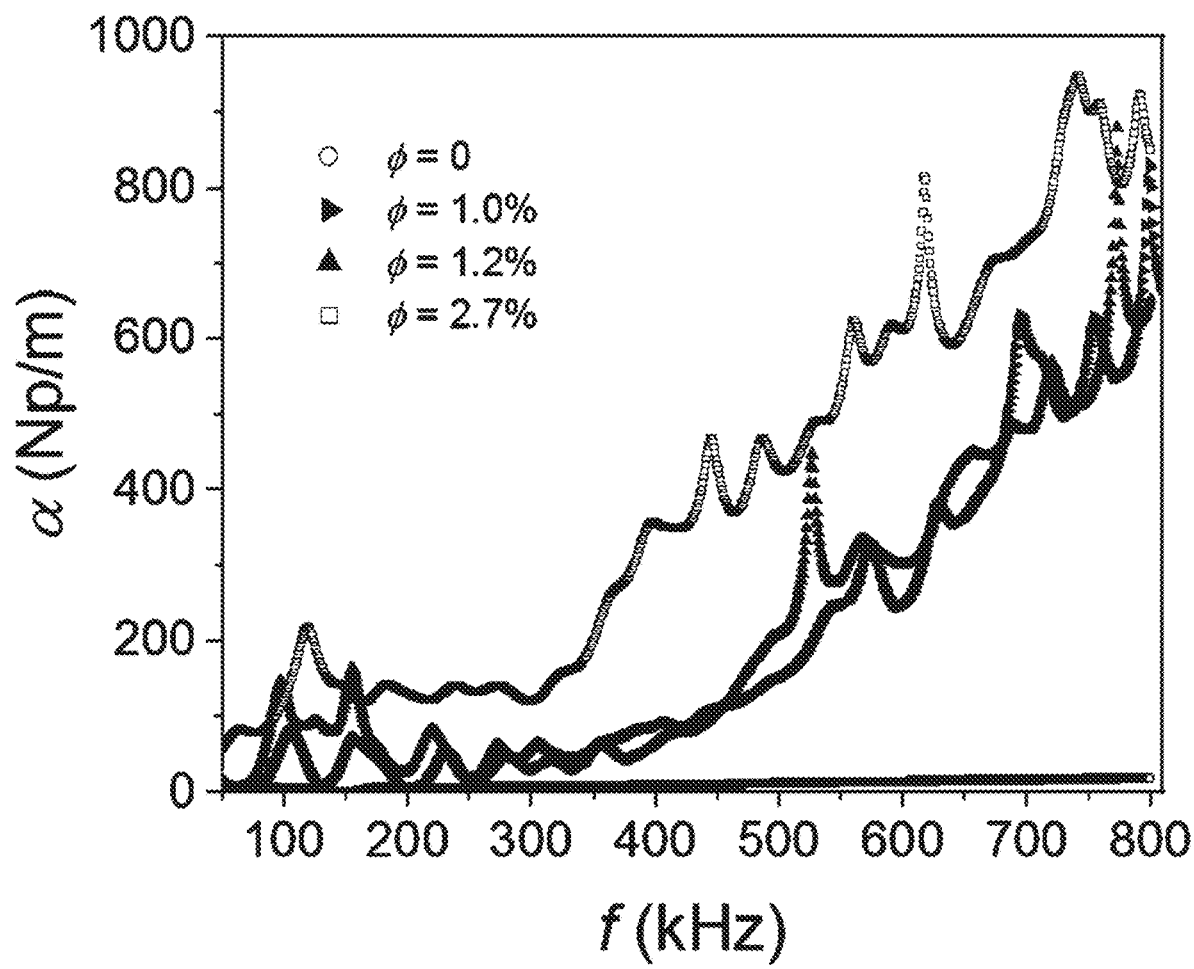

FIG. 26 shows attenuation coefficient α versus f for the undoped sample (open circles), and for three EMB volume fractions: $\phi$=1.0% (solid triangles), $\phi$=1.2% (solid triangles), and $\phi$=2.7% (open squares). The data for the undoped sample and for $\phi$=1.2% and $\phi$=2.7% are the same data sets shown in FIG. 5.

Figure 27:
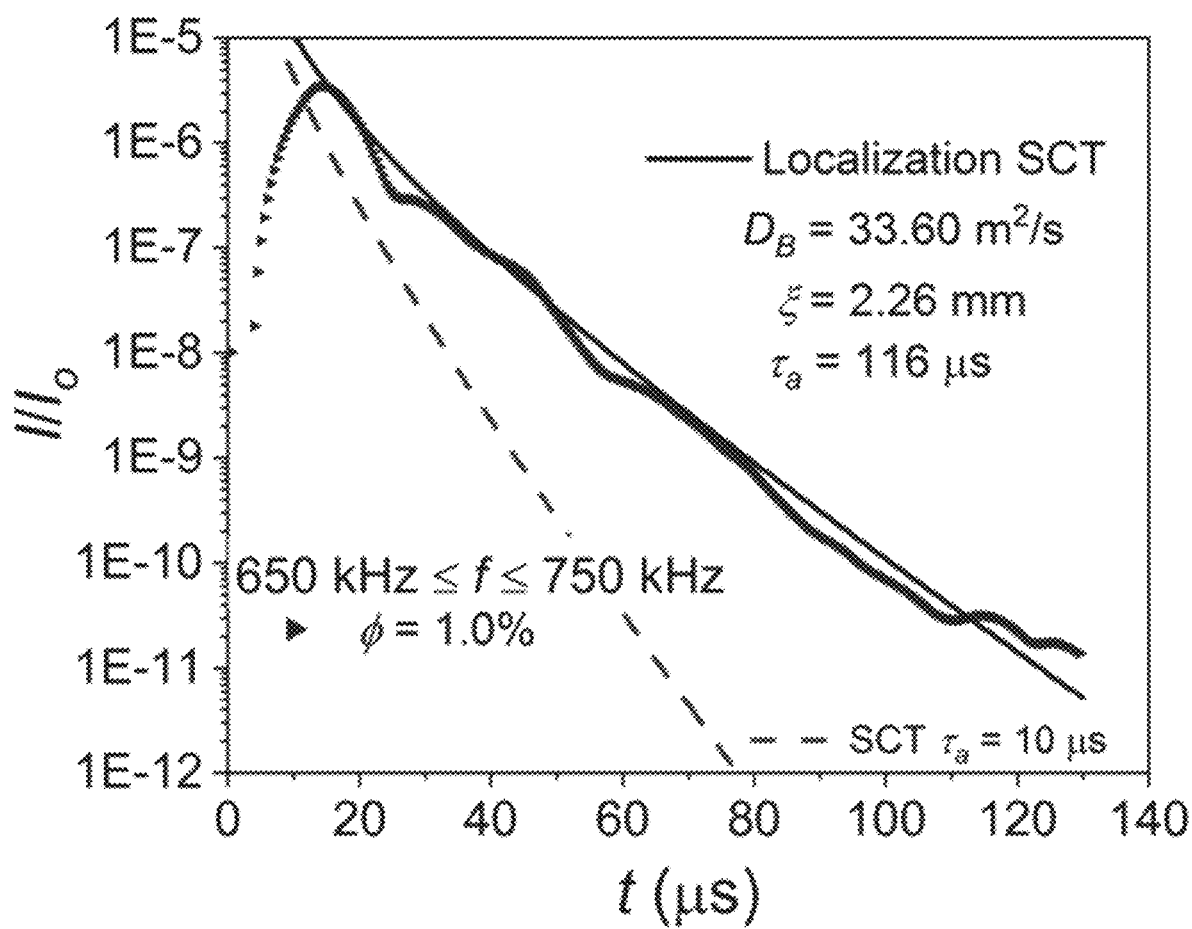
Figure 28:
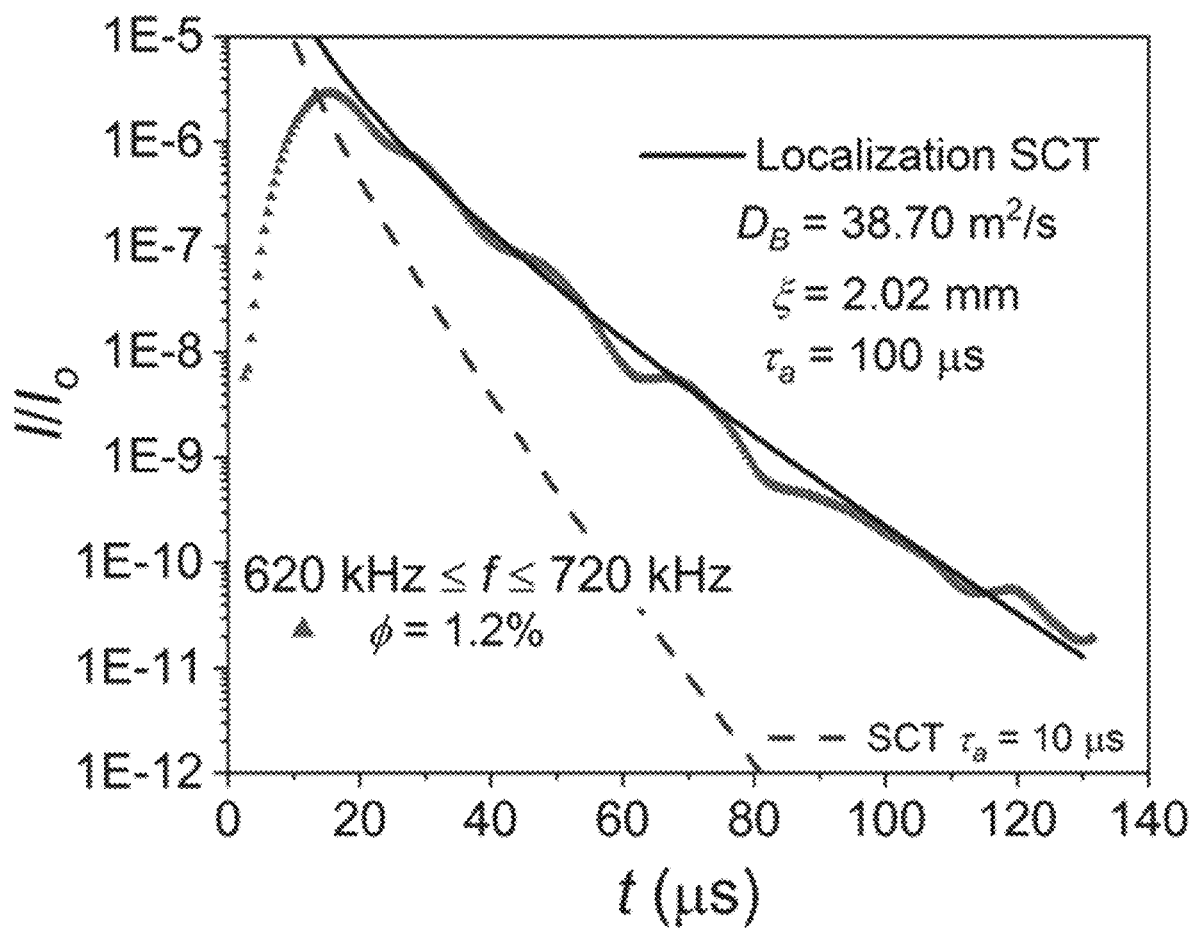
Figure 29:
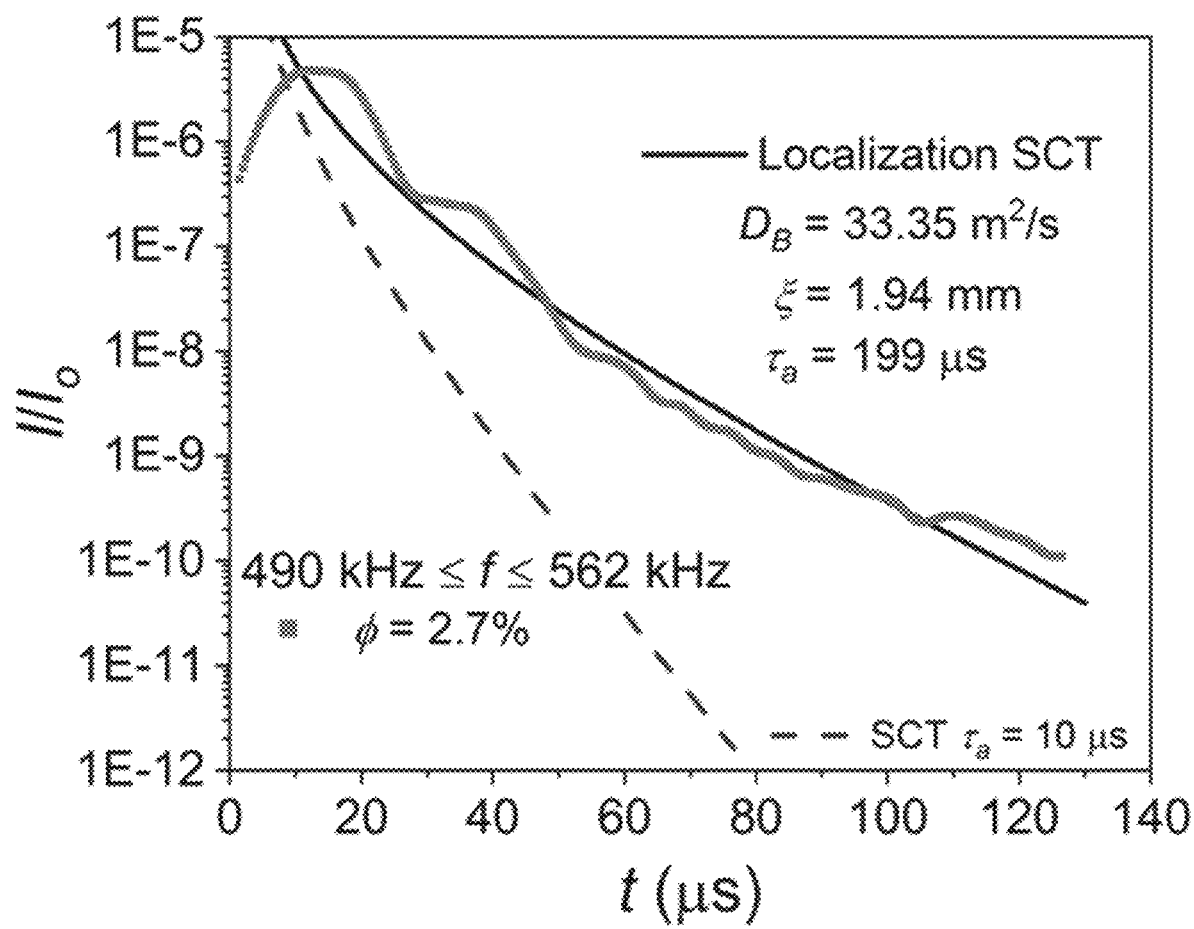

FIGS. 27-29 show normalized transmitted intensity peak envelope $I/I_O$ versus t found from averaging over 11 different speckle measurements for three separate EMB volume fractions. (FIG. 27, $\phi$=1.0%; FIG. 28 $\phi$=1.2%; FIG. 29, $\phi$=2.7%. The frequency ranges were chosen to target those frequencies between the mobility edges identified in FIG. 6 and Fig. ?, and the incoherent wave data is digitally filtered to target a specific range. Solid lines are fits to the self-consistent theory (SCT) of localization. The bare diffusion coefficient $D_B$, the localization length $\xi$, and the absorption time $\tau_a$ serve as free-fitting parameters for the SCT fitting and the parameters for each $\phi$ are specified. Dashed lines correspond to setting $\tau_a$=10 μs in the SCT fit while keeping all other parameters fixed at the values specified for each $\phi$.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Anderson localization arises from the interference of multiple scattering paths in a disordered medium, and applies to both quantum and classical waves. Soft matter provides a unique potential platform to observe localization of non-interacting classical waves because of the order of magnitude difference in speed between fast and slow waves in conjunction with the possibility to achieve strong scattering over broad frequency bands while minimizing dissipation. Disclosed herein is long sought evidence of a localized phase spanning up to 246 kHz for fast (sound) waves in a soft elastic medium doped with resonant encapsulated microbubbles. The transition into the localized phase is accompanied by an anomalous decrease of the mean free path, which provides an experimental signature of the phase transition. At the transition, the decrease in the mean free path with changing frequency (i.e. disorder strength) follows a power law with a critical exponent near unity. Within the localized phase the mean free path is in the range 0.4-1.0 times the wavelength, the transmitted intensity at late times is well-described by the self-consistent localization theory, and the localization length decreases with increasing microbubble volume fraction.

Described herein are observations of a broadband localized phase spanning up to 246 kHz for sound transmission through a suspending gel (a Bingham fluid) doped with compliant encapsulated microbubbles (EMBs) [29-31]. A key difference between this system and those systems searching for light localization is in the type of resonant scatterer (monopole scattering in this work versus dipole scattering in the case of light), which give rise to different near-field couplings that can affect localization [32]. An advantage of this system is the broad, continuous resonance frequency bandwidth for the EMB dopants spanning 100 s kHz (afforded by the soft matter disparate wave speeds resulting in the compressional wavelength being much larger than the EMB equilibrium diameter), which provides a tunable disorder strength and allows unprecedented access to the predicted localized phase and the corresponding phase transition. The transition into the localized phase occurs at a critical density $\rho c$=2.2×10$^9$ scatterers/m$^3$=0.09k$^3$ where k is the effective wave number, and is accompanied by a strong anomalous decrease in the measured scattering mean free path $l_S$, which provides an experimental signature of the phase transition. At the phase transition, the decrease in $l_S$ with changing frequency (i.e. disorder strength) follows a power law with a critical exponent $\gamma$=1.08±0.05. Within the localized phase the maximum ratio of the mean free path to the wavelength, $l_S/\lambda$, equals unity and this ratio reaches values as low as $l_S/\lambda$=0.4, which is expected for localization based upon early work by Ioffe and Regel [33]. Within the localized phase, the time-dependent transmitted intensity shows late-time deviations from diffusion, which cannot be explained by absorption and are in agreement with self-consistent theory predictions; the nature of the soft medium results in negligible coupling between longitudinal and transverse waves [34], which is an advantage ensuring the slow transverse waves do not skew the late-time analysis. Fitting the localized phase transmitted intensity to the self-consistent theory allows extraction of the localization length $\xi$ which is found to be more than a factor of five smaller than the sample thickness at an EMB volume fraction $\phi$=2.7%. At higher frequencies an observed change in slope of the frequency-dependent phase angle results in a factor 2.5 reduction in phase velocity and a discontinuous rise in $l_S/\lambda$, which corresponds to a second higher-frequency mobility edge and provides experimental evidence of a finite frequency range for the localized phase.

Disclosed are doped soft elastic materials (e.g. gels and polymers) with acoustic properties governed by the physics of Anderson localization and the Anderson phase transition. As used herein, soft refers to the inequality G<<B where G and B are the material's shear and bulk moduli, respectively. A few specific examples of applications include: 1. Materials with time-dependent transmission and reflection coefficients governed by the physics of Anderson localization for a vibration-free environment across a broad frequency band, and 2. Materials with energy-attenuating properties governed by the physics of the Anderson phase transition. The technique promotes a material compatible, reproducible, and scalable fabrication process that generates well-tailored spherical gas cavities within a soft material with a finely controlled size and resonance frequency distribution that are impermeable to liquids. The technique is independent of the soft material's elastic moduli and the specific elastic parameters of the dopants, and is applicable across the full frequency spectrum.

The disclosed article comprises three components: an elastomeric jacket or shell, a gel within the jacket, and a plurality of gas-filled, polymerically-encapsulated microbubbles suspended in the gel. The jacket can completely surround the volume of the gel. This combination can produce an article that exhibits Anderson localization at at least one frequency of sound waves impacting the article. As used herein, the terms "jacket" and "shell" are interchangeable.

Both the jacket and the gel are soft materials, meaning that the shear modulus is much less than and the bulk modulus. For example, for either material the bulk modulus may be at least 100 times the jacket shear modulus. The jacket and shell may also be impedance-matched to water. For example, each may have an acoustic impedance of $1.3\times10^6$-$1.7\times10^6$ kg sec$^{-1}$ m$^{-2}$ in a range of 0.05-0.8 MHz. Materials having these properties are known in the art and include those described herein.

The jacket may prevent deformation of the gel inside by either interior or exterior forces. This may be achieved by controlling the thickness of the jacket. It may have a thickness that prevents deformation of the jacket by the gel and/or by being submerged in water. The jacket may prevent deformation at depths of, for example, 1 m, 10 m, or 100 m. A suitable thickness range may be, for example, 2-6 mm.

The volume of the gel may be sufficient to produce Anderson localization. For example, it may have a smallest dimension of at least 10 mm, meaning that a sphere of diameter 10 mm would fit inside the volume occupied by the gel.

The microbubbles have a Gaussian particle size distribution and the largest microbubble has a diameter at least 10 times the diameter of the smallest microbubble. The average diameter may be determined by acoustic frequency desired to be localized. For example, the microbubbles may have an average diameter of 60-95 µm, and the Gaussian distribution may have a full width at half maximum of 60-80 microns. The microbubbles may be made of, for example, polyacrylonitrile having a thickness of about 100 nm, and may be filled with isobutane and pentane. The volume fraction of the microbubbles may be, for example 0.2-15 vol. % of the article.

When used, the article may be submerged in water, followed by directing or allowing the direction of sound waves toward the article. At a given frequency the article may exhibit Anderson localization. A number of properties may contribute to this effect. 1) At least a portion of the microbubbles may exhibit monopole scattering at this frequency. 2) The longitudinal wave speed of the jacket and/or gel may be at least ten times the transverse wave speed of the jacket and/or gel at this frequency. 3) The jacket and/or gel may have a tan($\delta$) at this frequency that is less than 0.5. 4) The gel thickness parallel to the sound waves may be at least three times the localization length and/or the gel width perpendicular to the sound waves may be at least 10 times the localization length at this frequency.

Potential advantages of the article include 1) the observation of Anderson localization and Anderson phase transitions in soft matter (polymers and gels), 2) resonant scattering of the dopants leading to a frequency-dependent disorder strength (the disorder strength is tunable with frequency), 3) broad band behavior (as disclosed below, the localized phase extends 246 kHz and the mobility edges span 42 kHz and 48 kHz), 4) very low dopant volume fractions needed to observe the localized phase (~1%), 5) the potential to tune the localized phase and the Anderson phase transition within bulk acoustic materials from the nanoscale, 6) the ability to tune Anderson localization and the Anderson phase transition with air volume fraction with a material, and 7) the ability to tune a material's energy attenuating properties by way of the Anderson phase transition.

There are currently no known alternative methods promoting: 1) the observation of Anderson localization and Anderson phase transitions in soft matter (polymers and gels), 2) a tunable disorder strength via a change in frequency leading to such localized effects, 3) the observed broadband behavior for the localized phase and mobility edges, 4) the observation of Anderson localization and the Anderson phase transition via resonant scattering, 5) the ability to induce a localized phase and an Anderson phase transition with such low dopant volume fractions (~1%), 6) the tunability of the localized phase and the Anderson phase transition within bulk acoustic materials from the nanoscale, 7) the tunability of the localized phase and the Anderson phase transition with the air volume fraction, and 8) the tunability of a material's energy attenuating properties by way of the Anderson phase transition.

The following examples are given to illustrate specific applications. These specific examples are not intended to limit the scope of the disclosure in this application.

Materials and Fabrication—The soft suspending gel (Carbopol ETD 2050) was obtained from the Lubrizol corporation. The pre-expanded encapsulated microbubbles (043 DET 80 d20) were obtained from Expancel (part of the Technical Solutions Group within Nouryon). The Uralite 3140 polymer was acquired from Ellsworth Adhesives.

Uralite 3140 is a two-component, low viscosity elastomer. Prior to combining parts A and B, the thicker Part A is degassed for several minutes to remove undesired trapped air. Subsequently, Part A is combined with Part B and then the entire mixture is again degassed for several minutes. Following degassing, the mixture is transferred to a pressure vessel that is connected to the mold into which the mixture is injected. Following a 24 hour partial cure, the Uralite is baked at 82° C. for 4 hours to hasten the curing time. Once the 4 mm-thick Uralite shell is fully cured the top is trimmed and a cap is glued in place using Uralite as the glue. All subsequent caps (those covering the gel injection ports) and suspension/weighting tabs are glued onto the shell with a water-resistant glue.

Preparation of the gel is done by slowly adding the Carbopol ETD 2050 powder (0.2 wt. %) to agitated water. Mixing is continued for several minutes to ensure consistency, and a neutralizer is added so that the final gel is pH neutral. The entire mixture is then degassed to remove any undesired trapped air. During degassing, the break occurs after approximately 1.5 minutes for the undoped material while multiple breaks are observed with increasing EMB concentration. The total degassing time is about one hour. Following degassing, the gel is mechanically injected into the Uralite shell. For those samples requiring encapsulated microbubbles (EMBs), the EMBs are added to the gel following the gel preparation and prior to degassing. Finally, the EMB/gel mix is then degassed prior to mechanical injection into the Uralite shell.

Sample thickness was measured using Starrett calipers with a resolution of $1.0\times10^{-5}$ m. Sample mass was measured on a scale with a resolution of either $5.0\times10^{-4}$ kg or $1.0\times10^{-5}$ kg. Volume of gel-based material was measured using a graduated cylinder with a line width of $5\times10^{-4}$ m. From these measurements, the sample density and EMB volume fraction were determined. The target volume fractions were $\phi=0.5\%$, $\phi=2.0\%$, and $\phi=10\%$.

Figure 1:
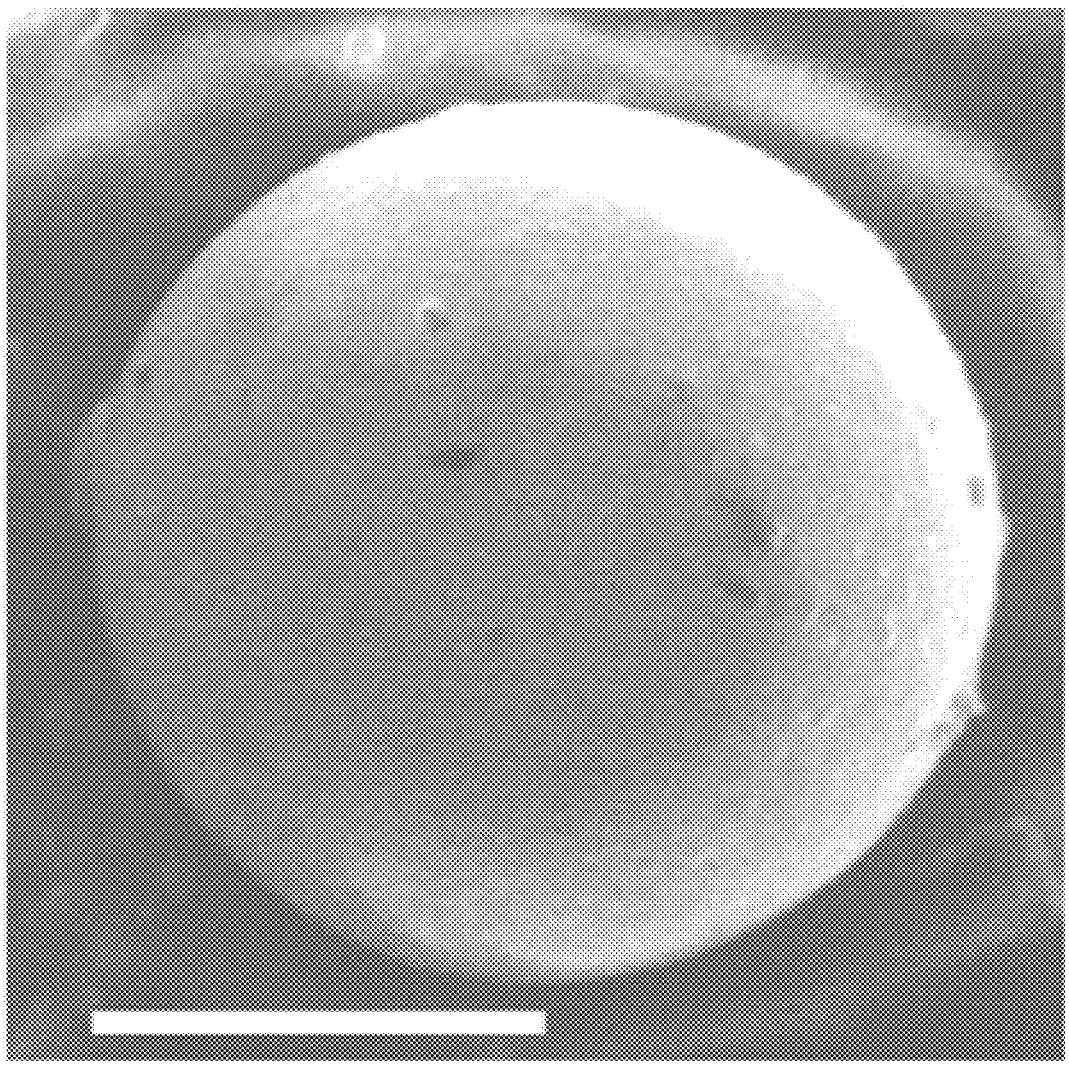
FIG. 1 shows a scanning electron microscopy image of an EMB. The scale bar is 8 μm.
Figure 2:
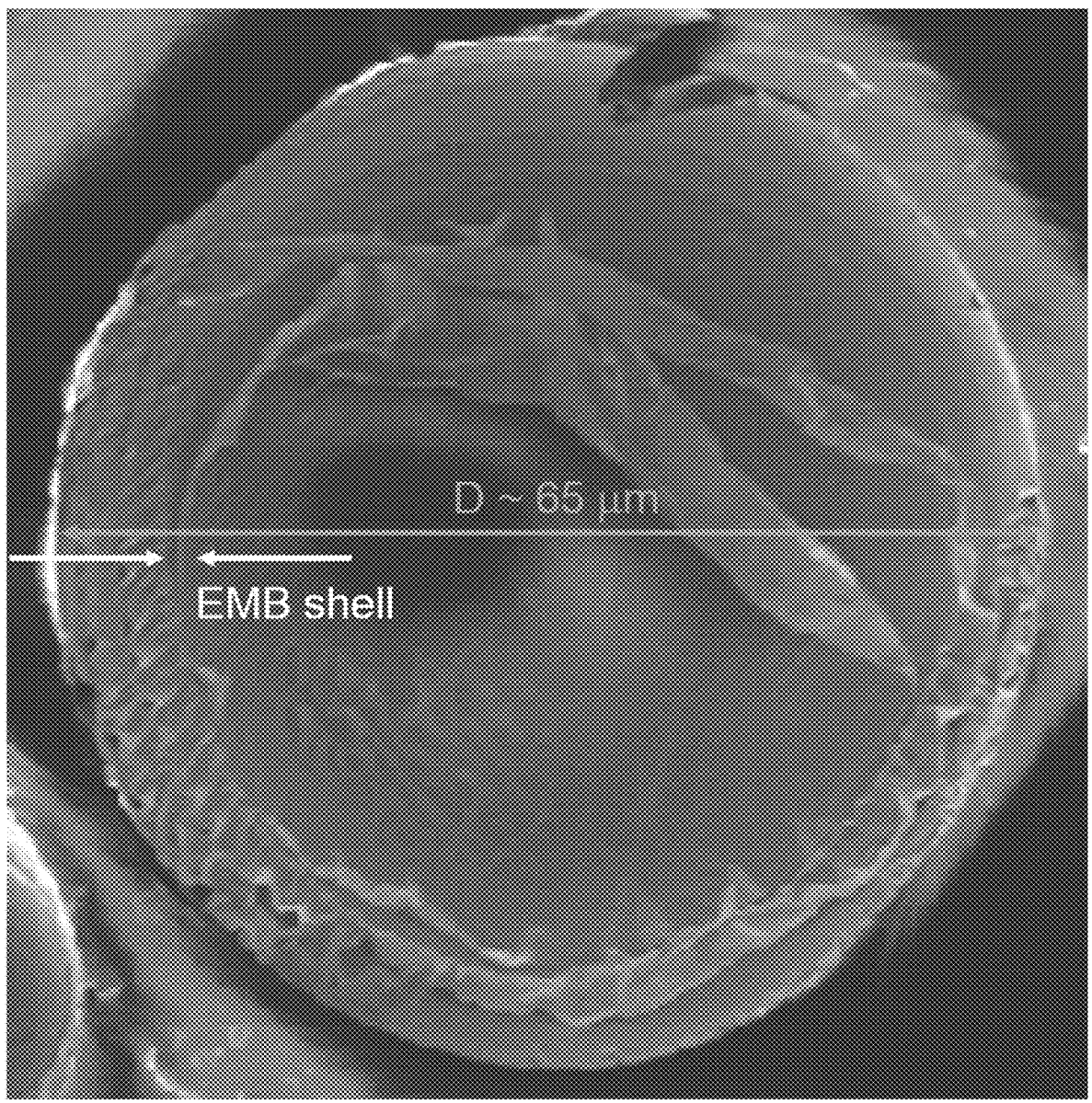
FIG. 2 shows a scanning electron microscopy (SEM) image of an intentionally deflated EMB with an initial equilibrium diameter D~65 mm. Upon EMB collapse, a cavity is left in the host polymer (in this case, Uralite). A segment of the shell is highlighted (short arrows) where the shell maintains contact with the polymer along the interior wall of the cavity. Multiple measurements of the shell thickness within the highlighted region gave a value 350-580 nm with an average of 437 nm. Note, the way the EMB has collapsed suggests that the true EMB thickness is half of the measured thickness, or 219 nm.

EMB characterization with scanning electron microscopy—Scanning electron microscopy (SEM) was used to confirm EMB surface uniformity as well as to quantify the EMB shell thickness. FIG. 1 shows an SEM image of an EMB following fabrication of a Uralite-doped sample and subsequent exposure of the EMB by cutting into the doped polymer with scissors. The image in FIG. 1 shows an EMB with no significant surface abnormalities or deviations from a spherical geometry. Also, FIG. 2 shows an SEM image of an intentionally deflated EMB, which allows for a measurement of the shell thickness. A thickness measurement was made where the deflated shell maintains contact with the remaining polymer cavity. Multiple measurements of the shell thickness within the highlighted region of FIG. 2 gave a value ~350-580 nm with an average of ~437 nm (note, the way the EMB collapsed suggests the true EMB thickness is half the measured thickness, or ~219 nm).

In-water measurements Measurements were carried out using a 0.5 MHz piston-faced immersion transducer and a Reson TC 4035 hydrophone from Teledyne Marine. The experiments utilized a Krohn-Hite 5920 arbitrary waveform generator. Prior to the output waveform reaching the source, the waveform was filtered with an Ithaco 4302 dual 24 dB/octave filter and then amplified using an E&L 240L RF power amplifier. The hydrophone signal was amplified using an Ithaco 1201 low-noise preamplifier before being digitized for data collecting and processing. For all data sets presented 1,000 measurements were collected, averaged together, and a background subtraction was used to eliminate any y-axis offset. The sample temperature was monitored throughout the duration of the experiments and was T~296-298 K. Samples were held in place underwater using fishing line with weights to hold the sample stationary. Appropriate correction factors were applied to the data, which accounts for the finite sample thickness as well as the measurement range.

Figure 3:
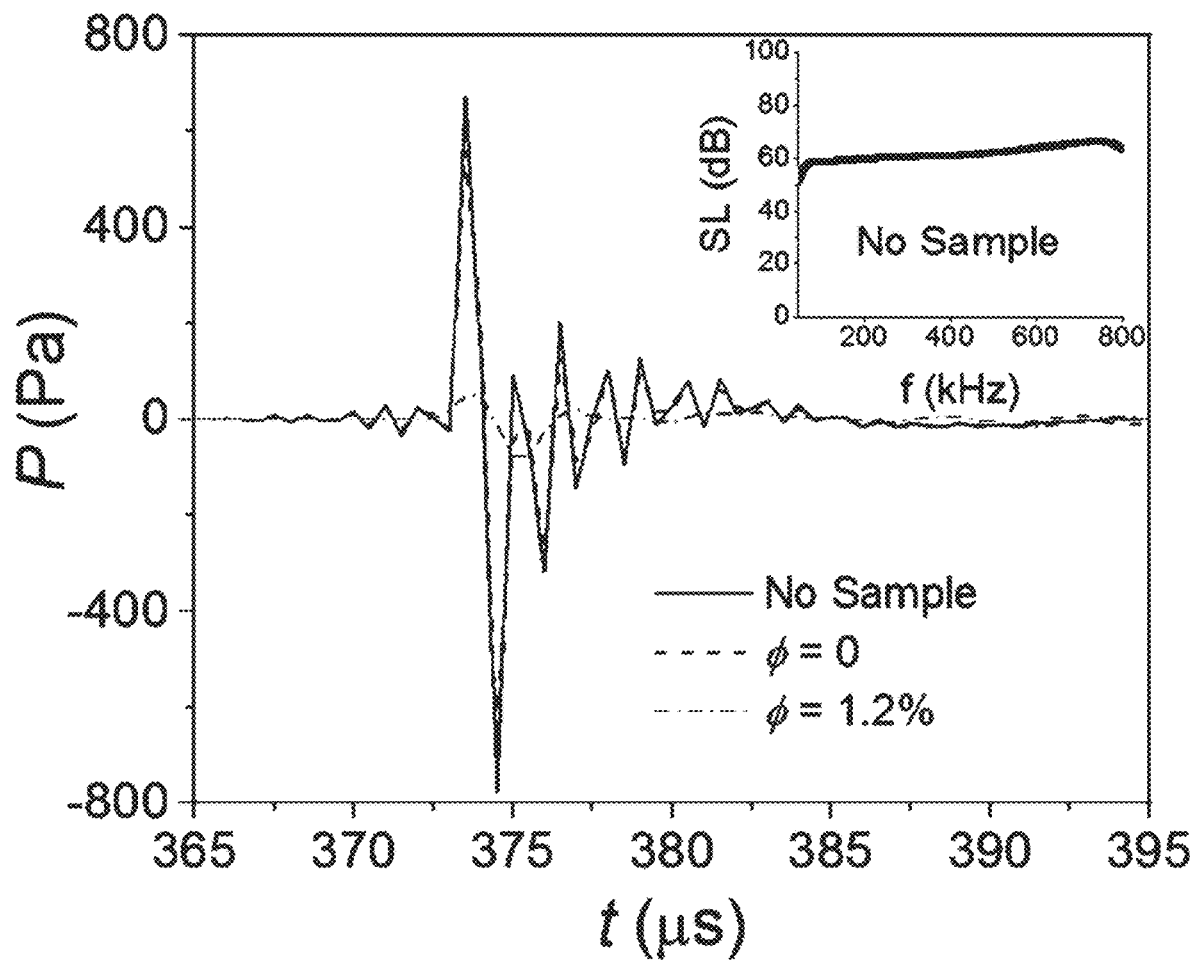
FIG. 3 shows pressure P versus time t showing the incident wavepacket used to obtained the data shown in FIGS. 4-7 (no sample, solid line) as well as transmission through an undoped sample (dashed line) and a gel layer doped to $\phi=1.2\%$ (dashed/dotted line). Inset: sound level (SL) frequency spectrum of the incident wavepacket.

FIG. 3 shows the transmitted pressure P versus time t for the water reference (no sample), an undoped sample, and for $\phi=1.2\%$ (the maximum pressure decreases over an order of magnitude upon doping). The wavepacket shown in FIG. 3 for the water reference (No Sample data set) was used to collect the data presented in FIGS. 4-7. The data shown in FIG. 3 indicates the undoped sample group velocity is equal to that of water. Further, at f=700 kHz the attenuation coefficient $\alpha$=15 Np/m was determined for the undoped sample, which is a factor of 59 smaller than the maximum $\alpha$ measured for $\phi=1.2\%$ (881 Np/m) and indicates minimal attenuation due to the soft materials.

For measuring within independent speckles, the sample was translated within the plane perpendicular to the central axis from the source transducer to the hydrophone. Displacements larger than the wavelength of sound in water at 500 kHz, namely $\lambda$3 mm. were used. The sample was displaced such that the source-hydrophone central axis traced a circle counterclockwise about the sample center. Furthermore, the aerial dimensions of the hydrophone sensor were smaller than the speckle coherence area ($\sim\lambda^2$), which ensured measurements within independent speckles.

Figure 8:
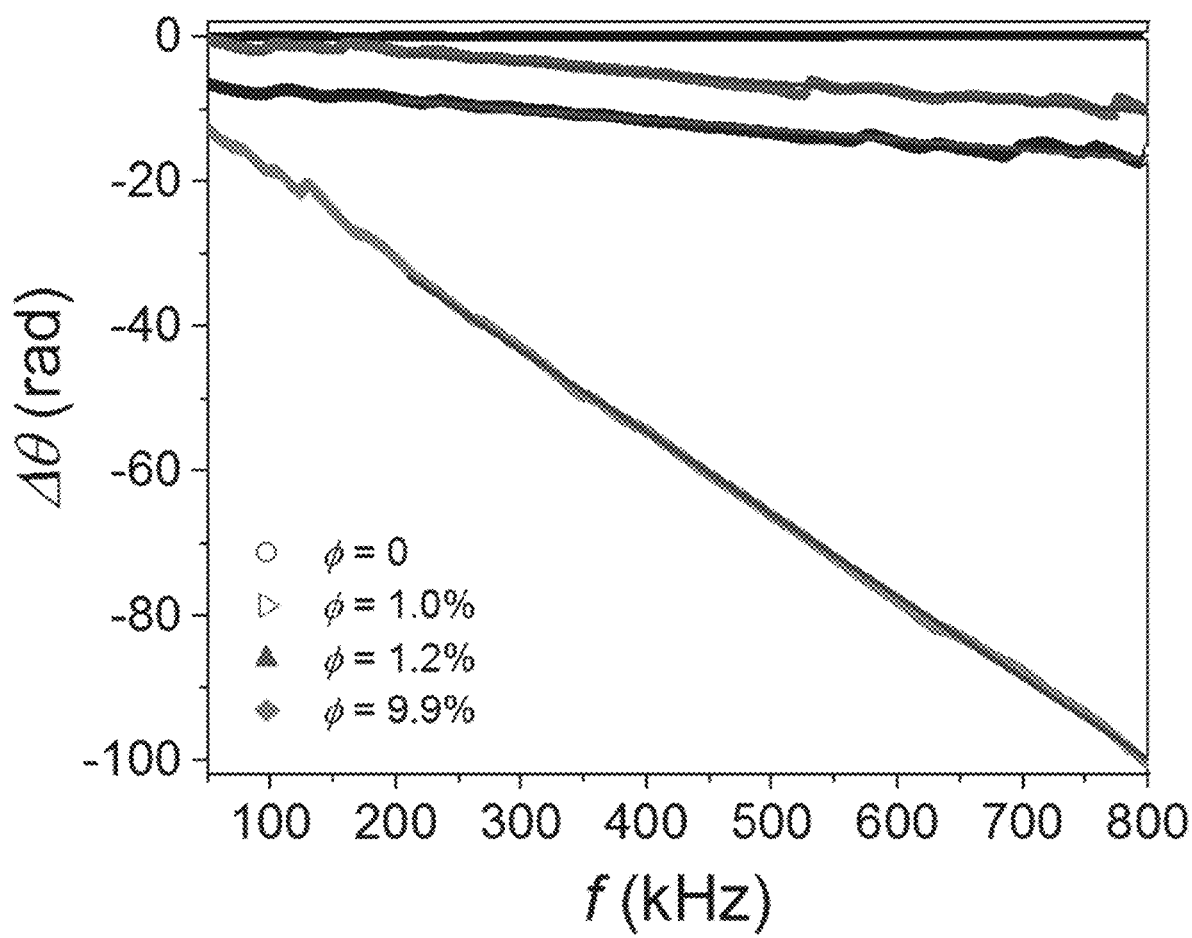
FIG. 8 shows phase change $\Delta\theta$ versus frequency f for an undoped sample (open circles), and three doped samples with EMB volume fractions f=1.0% (open triangles), f=1.2% (solid triangles), and f=9.9% (solid diamonds). The lines exemplify the linear fittings used to determine the material longitudinal phase velocity $v_L$.

EMB-doped Soft Matter—Samples consisted of an EMB-doped gel encased within a polymer shell; the gel and polymer shell are soft since G<<B where G and B are the shear and bulk moduli, respectively. The longitudinal phase velocity $v_L$, determined from the coherent part of the transmitted energy, is found from the change in phase angle $\Delta\theta$ as a function off (FIG. 8) where the phase spectrum is extracted from the transfer function of the fast Fourier transforms (FFT) for the sample and water reference data sets. Values for $v_L$ are determined from $v_L=L/(L/v_W)-[(1/2\pi)(\Delta\theta/\Delta f)]$ where L is the material thickness and $v_W$=1,492 m/s is the speed of sound in water. It was determined that $v_L$=1,480 m/s±10 m/s for the 4 mm-thick Uralite, $v_L$=1,498 m/s±5 m/s for the undoped gel sample (both the Uralite polymer and Carbopol 2050 gel are closely impedance-matched to water), $v_L$=1,123 m/s±6 m/s for the sample with $\phi=1.0\%\pm0.6\%$, $v_L$=1,133 m/s±7 m/s for $\phi=1.2\%\pm0.9\%$, $v_L$=832 m/s±3 m/s (200 kHz<f<600 kHz) and 334 m/s±2 m/s (624 kHz<f<781 kHz) for $\phi=2.7\%\pm0.5\%$, and $v_L$=405 m/s±1 m/s for $\phi=9.9\%\pm1.8\%$. With $v_L$ the material bulk modulus B is estimated from $v_L=(B/\rho_M)^{1/2}$ where $\rho_M$ is the material density. For bare Uralite $B_U$ is estimated as ~2.3 GPa and for the gel $B_G$ is estimated as 2.2 GPa.

Figure 9:
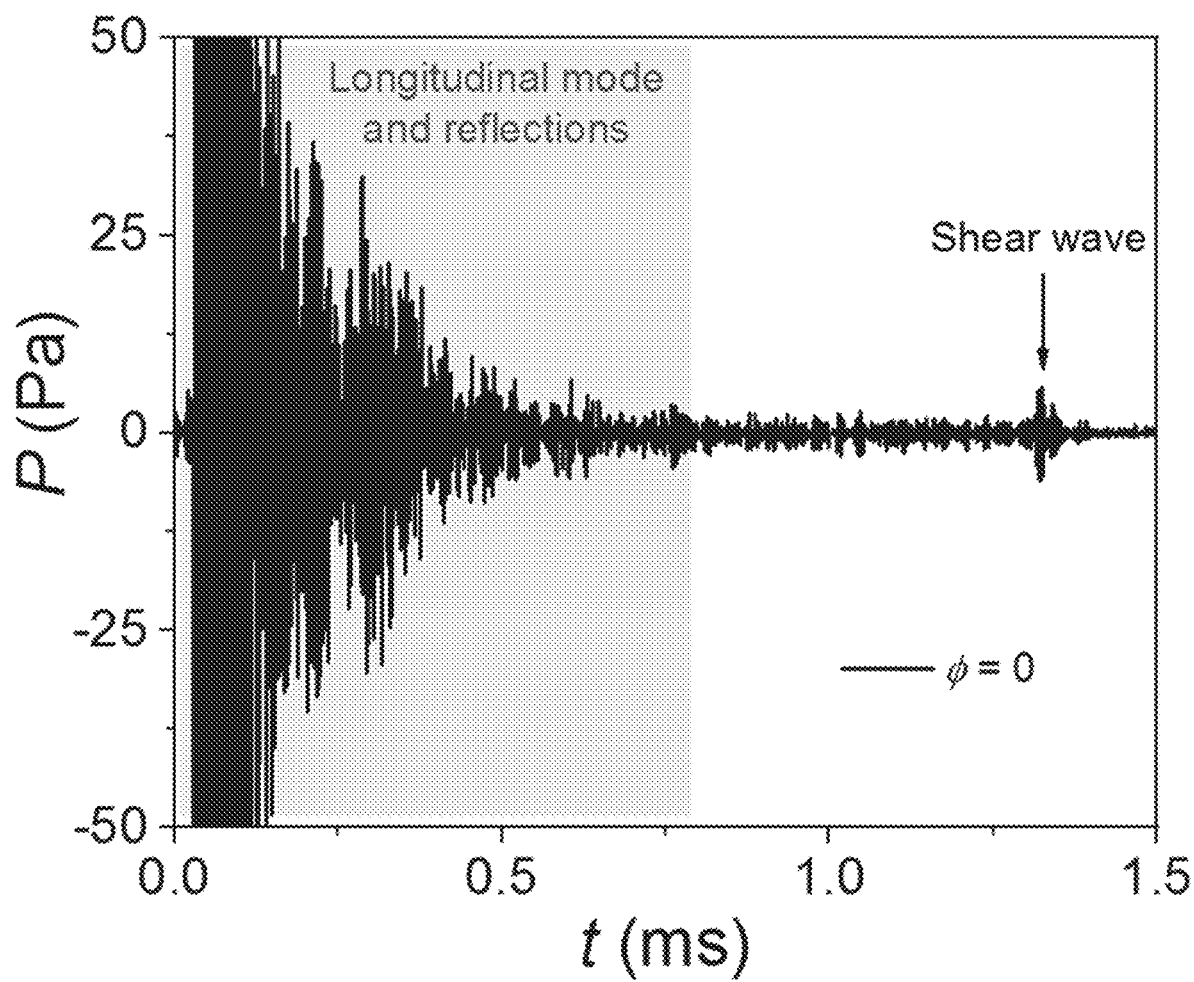
FIG. 9 shows pressure P vs. time t for the undoped sample measured with two shear wave transducers. Detection of the shear mode can be seen at t~1.30 ms.

Prior studies have shown the Uralite shear modulus is $G_U$~6 MPa [56]. Using the shear wave measurement techniques outlined in Reference 56 and from the undoped gel shear wave data set shown in FIG. 9 the gel shear modulus is estimated to be $G_G$~66 kPa.

Figure 10:
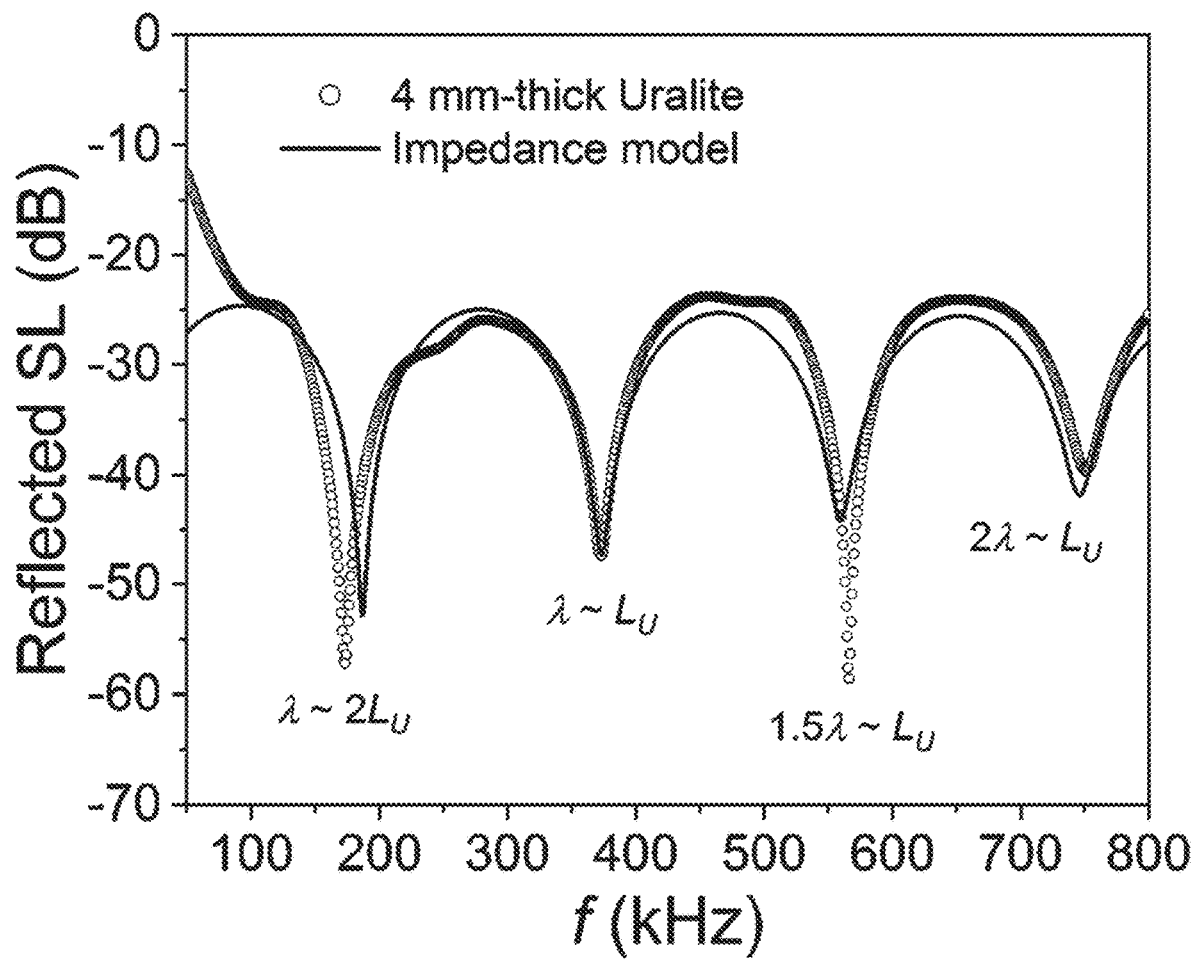
FIG. 10 shows reflected sound level (SL) versus frequency f for a 4 mm-thick Uralite sample (open circles). The thickness modes are indicated where l is the wavelength and $L_U$ is the Uralite thickness. Note that a 6.62 dB correction factor has been applied to the data to account for the measurement range. The solid line is a fit to an impedance model accounting for a f-independent loss factor $\tan(\delta)=0.025$ within the complex wave speed.

The materials exhibit low mechanical loss (tan($\delta$)<0.03) within the targeted frequency range. The material loss factor tan($\delta$) is estimated from two separate measurements, namely from reflection and transmission measurements. FIG. 10 shows the measured reflected SL versus f for a 4 mm-thick Uralite sample along with a fit to an impedance model [57] that takes into account a complex wave speed of the form $v=v_O (1-(\tan(\delta)/2))/1-i(\tan(\delta)/2)$ I where $v_O$ is taken to be 1,492 m/s. From the impedance model fit tan($\delta$) is estimated as ~0.025 for Uralite within the frequency range of interest.

Also tan($\delta$) is estimated from the measured attenuation coefficient $\alpha$ determined from the coherent part of the transmitted wavepacket where $I/I_O=e^{-(2\alpha L v)}$. Assuming tan($\delta$)<<1 and disregarding the tensor character of the Uralite elastic quantities [58] tan($\delta$) can be estimated from $\alpha\lambda=\pi$ tan($\delta$). From the transmitted sound intensity, tan($\delta$)~0.023 for Uralite at f=700 kHz and that tan($\delta$) is always less than 0.03 across the full f range of interest.

Figure 11:
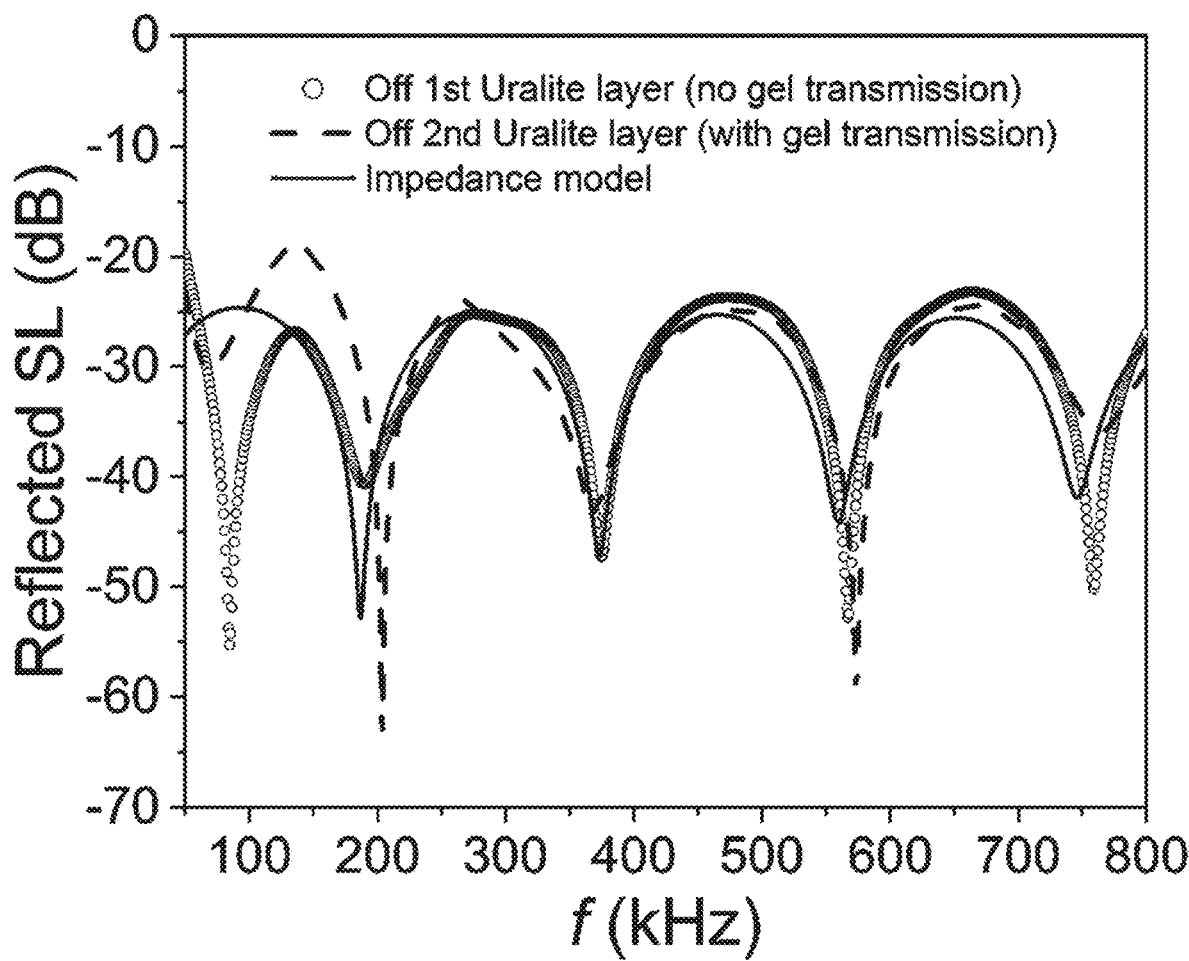
FIG. 11 shows reflected sound level (SL) versus frequency f for the undoped sample like that shown in FIG. 12. The data has been time windowed to isolate the reflected sound energy for each of the two Uralite surfaces. The open circle data set corresponds to the Uralite surface closest to the transducer and hydrophone. The dashed line data set corresponds to the farther Uralite surface (meaning sound transmission through the gel twice before the hydrophone detects the reflected energy). Note that correction factors of 6.24 dB and 6.98 dB have been applied to the $1^{st}$ and $2^{nd}$ Uralite layer data sets, respectively, to account for the measurement range. The solid line is the same impedance model fit shown in FIG. 10, which takes into account a f-independent loss factor $\tan(\delta)=0.025$ within the complex wave speed.
Figure 12:
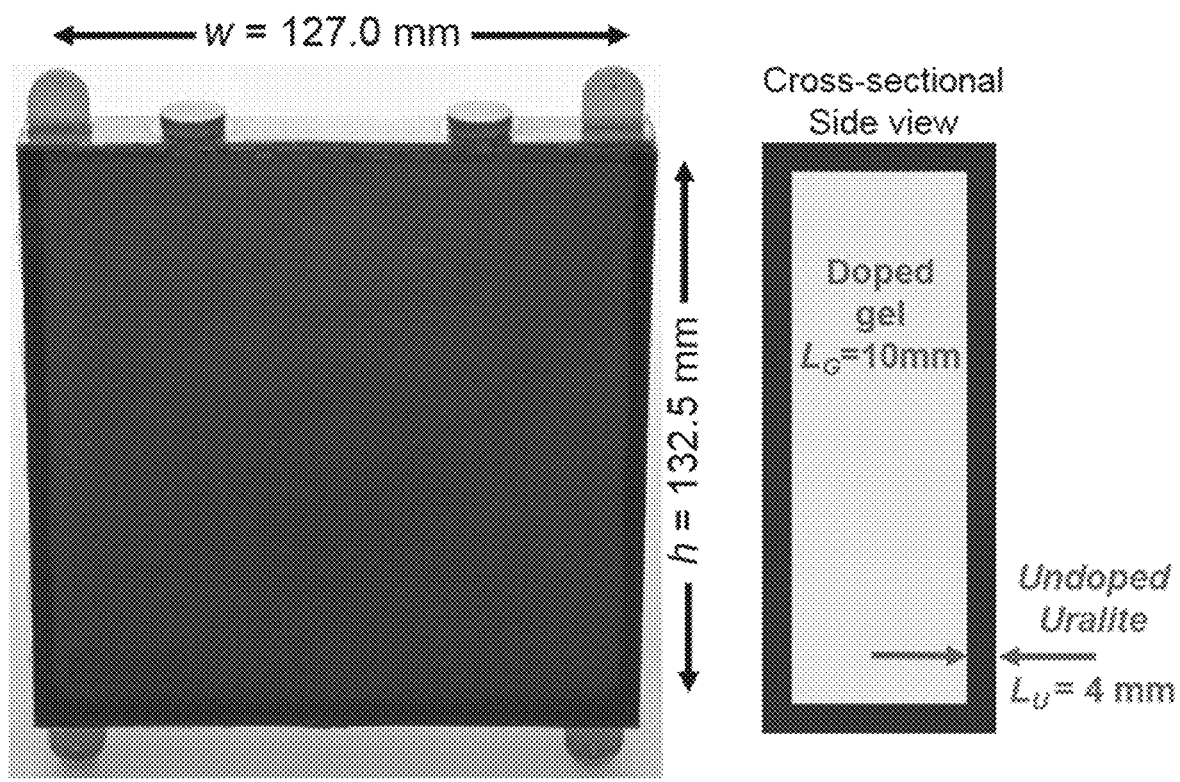
FIG. 12 schematically illustrates a Uralite shell encasing encapsulated microbubble (EMB)-doped gel (Carbopol ETD 2050, 0.2 wt %). The center ports are sealed input/output through which the gel was injected. The corner tabs are for suspension and weighting. The cross-sectional side view shows material thicknesses: $L_G$ and $L_U$ for the doped gel and Uralite layers, respectively.

Additionally, FIG. 11 shows a similar reflection measurement where the reflected sound pressure is measured from the Uralite/gel composite like that shown in FIG. 12. Here, the gel is undoped. The reflected data is time-windowed so as to isolate the reflected energy from the two Uralite surfaces, which arrive at the hydrophone at different times. Also shown is the fit to the Uralite impedance model with tan($\delta$)~0.025. Despite propagation through the gel twice for the farther Uralite surface negligible changes are found in the reflected SL between the two Uralite surfaces. Though tan($\delta$) cannot be directly estimated for the gel, the plots shown in FIG. 11 suggest negligible addition to the tan($\delta$) ~0.025 estimate due to the presence of the gel.

Figure 13:
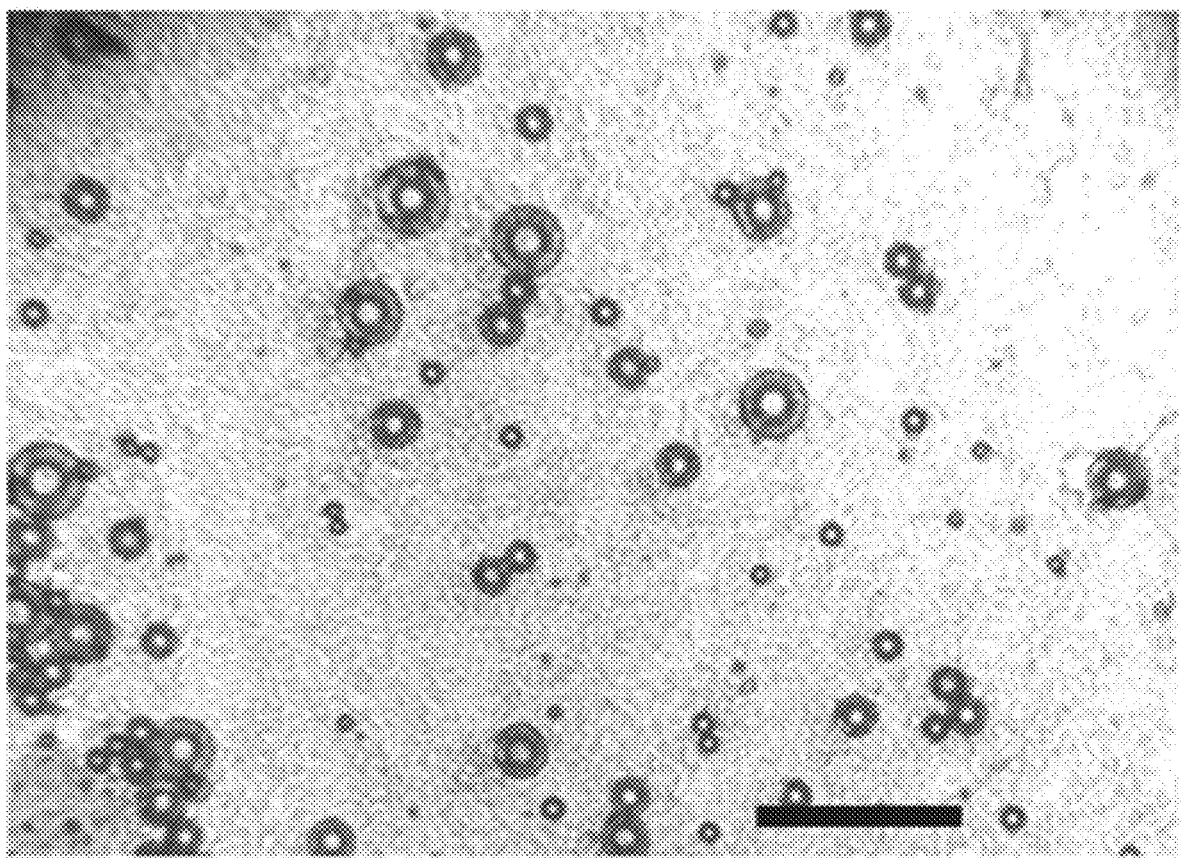
FIG. 13 shows an optical image of the gel (on a glass slide) doped to a volume fraction $\phi=1.2\%\pm0.9\%$. The scale bar is 300 μm. The exaggerated shell thickness and bright spot in the EMB center are the result of light focusing.
Figure 14:
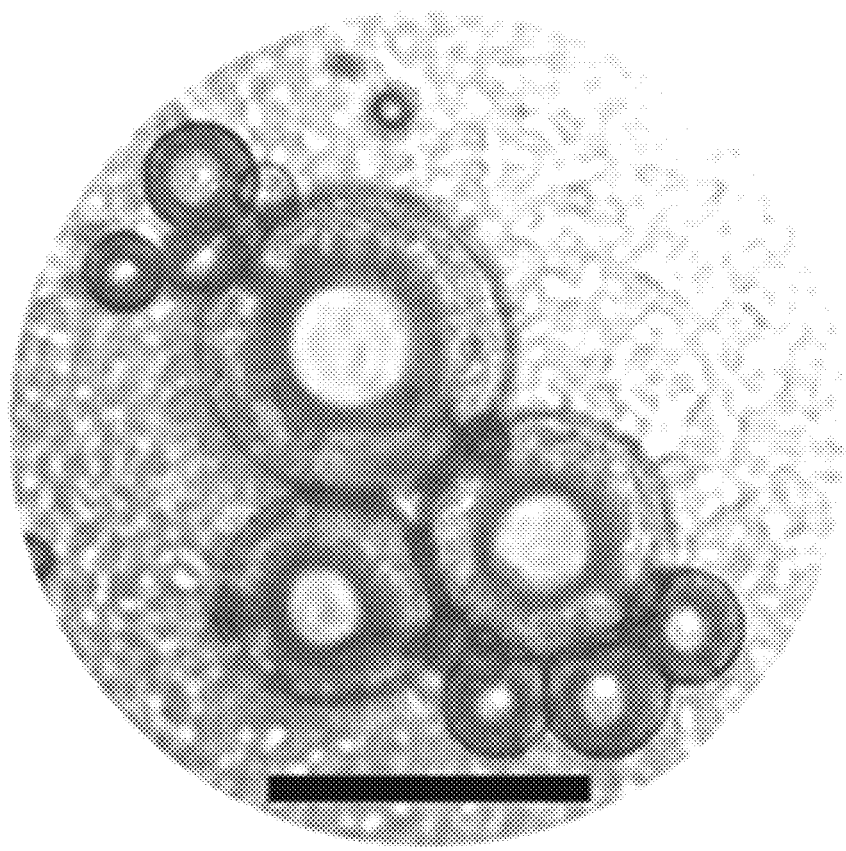
FIG. 14 shows another optical image of the gel. The scale bar is 125 μm.
Figure 15:
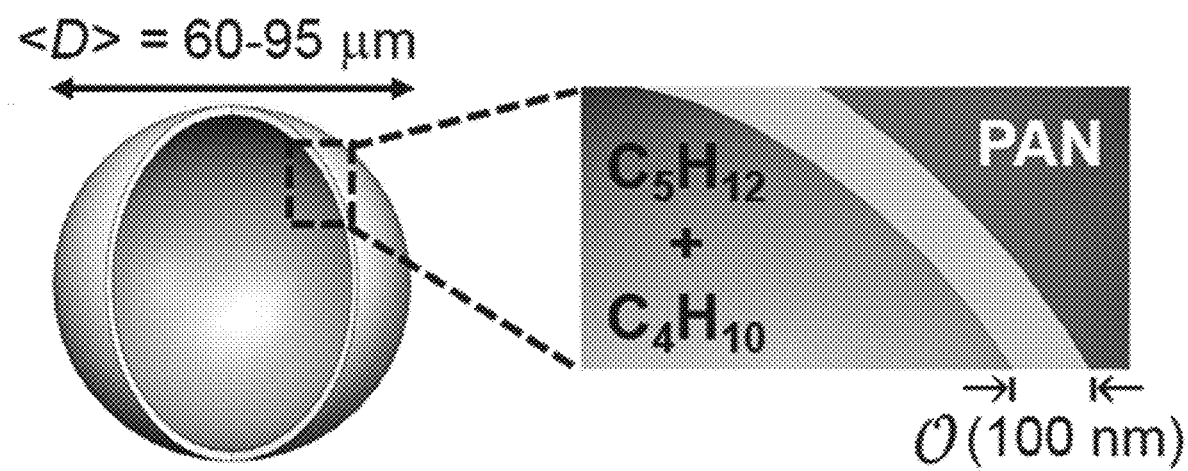
FIG. 15 schematically illustrates an EMB. The enclosed gas is a mixture of isobutane and isopentane. The shell is primarily polyacrylonitrile (PAN). The shell thickness is of order 100 nm.

A sample and the side-view cross section are shown in FIG. 12. The thickness of the doped gel LG=10 mm while the thickness of the undoped polymer (Uralite) shell LU=4 mm. The 4 mm-thick polymer shell is acoustically impedance-matched to water with negligible attenuation and reflection in the frequency range of interest and provides structural support for the doped gel. Optical images of the gel doped with EMBs to a volume fraction $\phi=1.2\%\pm0.9\%$ are shown in FIGS. 13 and 14. FIG. 15 shows an EMB schematic, and FIG. 1 shows an EMB image obtained with scanning electron microscopy. The effect of the nanoscale shell on sound velocities in soft materials was previously reported [35]. It is noted that the EMBs remain fixed in position within the gel with no observable time-dependent drift.

Figure 16:
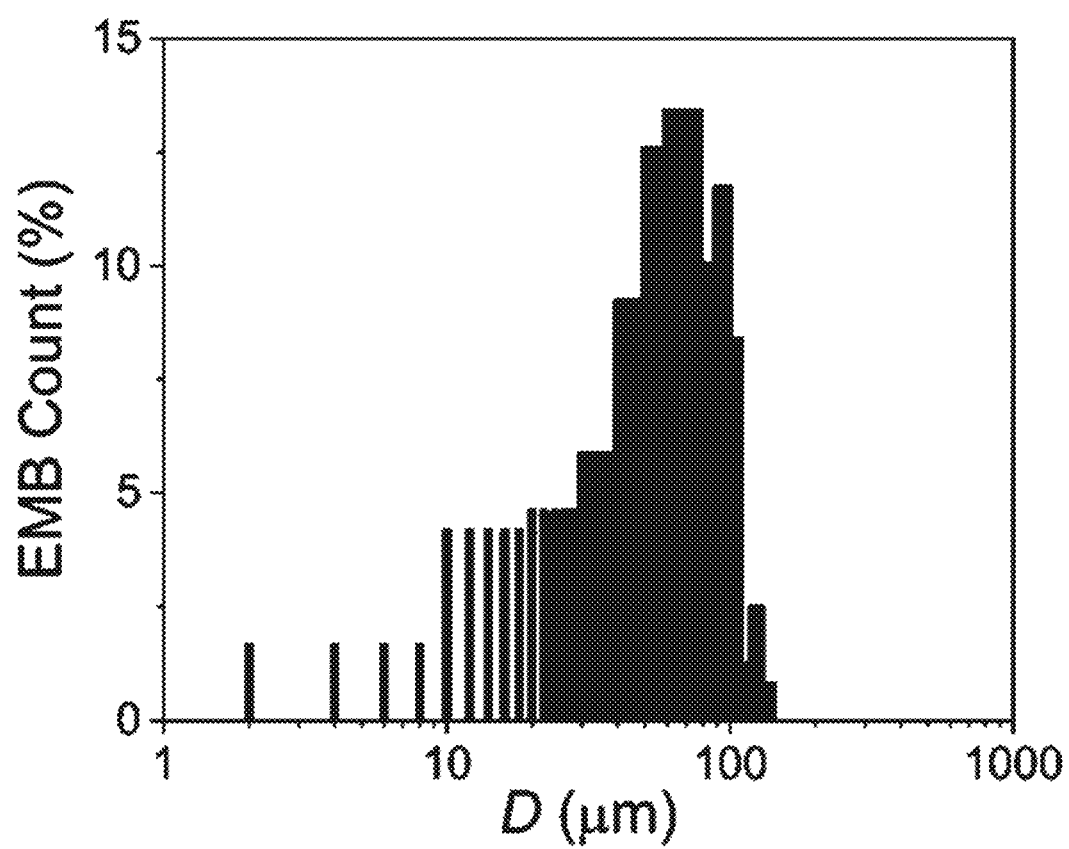
FIG. 16 shows EMB diameter D distribution determined via optical microscopy. A total of 238 diameters were measured to obtain the distribution.
Figure 17:
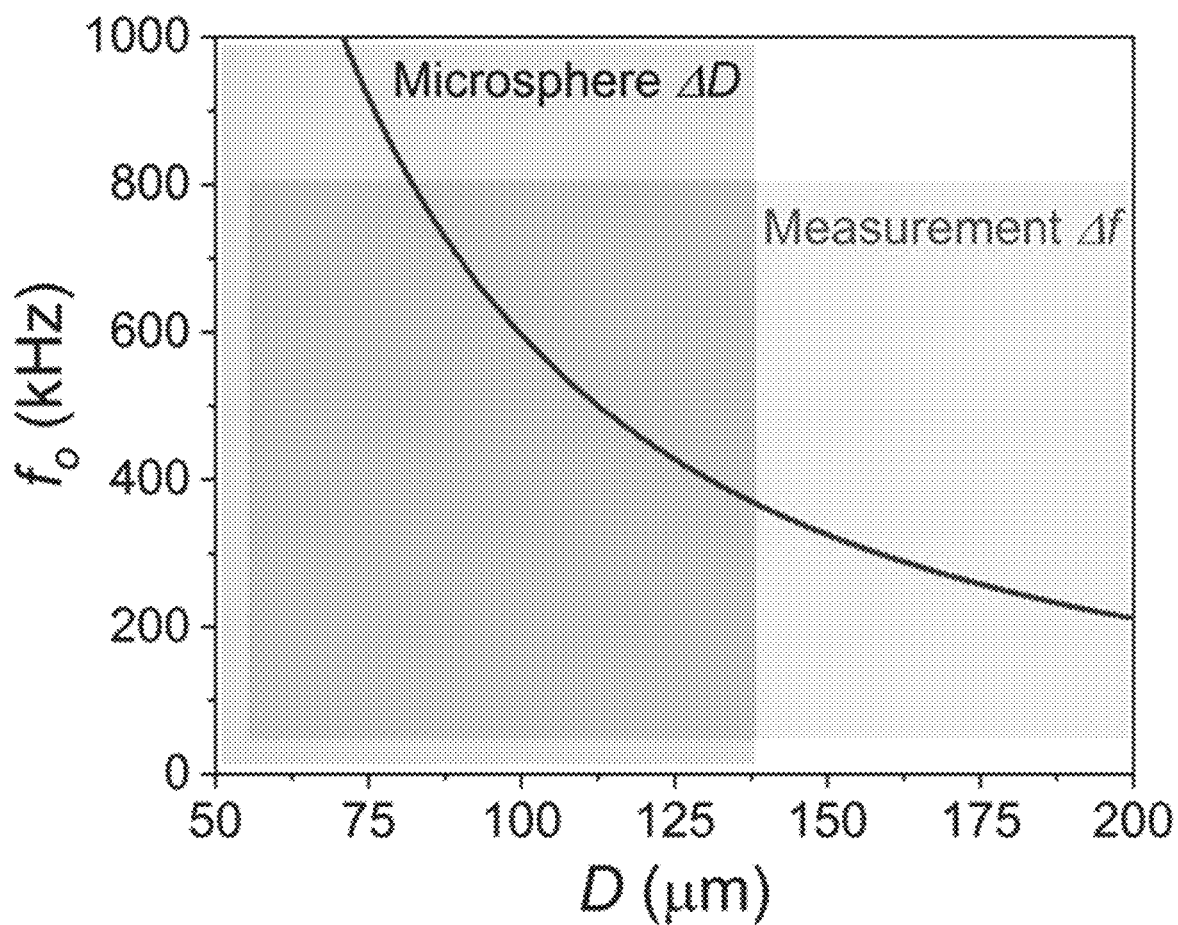
FIG. 17 shows predicted EMB resonance frequency $f_O$ versus D. The left-hand shaded region corresponds to those diameters within the distribution as in FIG. 16. The lower shaded region corresponds to the experimental frequency range.

FIG. 16 shows the EMB diameter D distribution; the average diameter falls within the 60-95 μm range (with approximately half the EMB diameters larger than this average value), and the largest (smallest) measured diameters fall in the 130-140 μm (1-10 μm) range. FIG. 17 shows the predicted EMB resonance frequency $f_O$ versus D, and indicates a large range of EMB resonance frequencies coincide with the experimental frequency range.

The linear harmonic oscillation of the EMB is obtained from solutions of a Rayleigh-Plesset-like differential equation [59], which considers damping due to acoustic radiation and the EMB shell viscosity. The $f_O$ prediction takes into account both the shell and gel densities ($\rho_S$=1,184 kg/m$^3$ and $\rho_G$=990 kg/m$^3$, respectively), the shell inner and outer radii (a shell thickness of 100 nm is assumed), the gel hydrostatic pressure (taken to be P=101.325 kPa), the enclosed gas polytropic index ($\kappa$~1.1), and the shell shear modulus ($G_S$~1.43 GPa) that was studied in prior work [56].

The resonance frequency $f_O$ is given by $$f_O^2 = (1/[\mu_S \alpha (2\pi R_{10})^2])[3\kappa P_0 + (4G_S(R_{20}^3 - R_{10}^3)/R_{20}^3)]$$

where $\alpha = [1 + (\rho_I - \rho_S)/\rho_S) R_{10}/R_{20}]$ and $\rho_S$ is the EMB shell density, $\rho_I$ is the undoped gel density, $R_{10}$ and $R_{20}$ are the initial inner and outer EMB shell radii, respectively, $\kappa$ is the polytropic index of the enclosed gas, $P_O$ is the gel hydrostatic pressure, and $G_S$ is the shell shear modulus.

For a specified EMB diameter the f-dependent scattering cross section $\sigma(f)$ is given by $$\sigma(\omega) = 4\pi R_{10}^2 \left(\frac{\rho_I^2}{\rho_S^2 a^2}\right)\left(\frac{\omega^4}{(\omega^2 - \omega_O^2)^2 + (2\beta\omega)^2}\right)$$

where $\omega = 2\pi f$, $\omega_O = 2\pi f_O$, and $\beta$ is the total damping coefficient. Damping from acoustic radiation $\beta_{AR}$ and shell viscosity $\beta_{SV}$ are determined by $$\beta_{AR} = \frac{\rho_I}{\rho_S a} \frac{\omega^2 R_{10}}{2v_O}\left[1 + \frac{\rho_I^2}{\rho_S^2 a^2} \frac{\omega^2 R_{10}^2}{v_o^2}\right]^{-1}$$

$$\beta_{SV} = \frac{2\mu_S(R_{20}^3 - R_{10}^3)}{a\rho_S R_{10}^2 R_{20}^3}$$

where $v_O$ is the undoped gel sound speed and $\mu_S$~10 Pa·s is the estimated PAN shell shear viscosity [56].

The thermal damping coefficient for EMB oscillations [S6] is determined from $$\beta_{TH} = \frac{9P_O\kappa(1 + \Delta_P R_{10}/R_{20})^{-1}[G_+(\sqrt{Pe_g}) - 2/Pe_g]}{2\rho_S R_{10}^2(\kappa - 1)\omega\{[3G_-(\sqrt{Pe_g}) + 1/(\kappa - 1)]^2 + 9[G_+(\sqrt{Pe_g}) - 2/Pe_g]^2\}}$$

where $\Delta_P = (\rho_I - \rho_S)/\rho_S$, $Pe_g = 2\omega\rho_g c_g R_{10}^2/k_g$ is the gas Peclet number (for isopentane we use $\rho_g$=616 kg/m$^3$, $c_g$=1,660 J/kg*K, and $k_g$=0.11 W/m*K), and G± is given by $$G_\pm(\sqrt{Pe_g}) = \frac{1}{\sqrt{Pe_g}}\left[\frac{\sinh(\sqrt{Pe_g}) \pm \sin(\sqrt{Pe_g})}{\cosh(\sqrt{Pe_g}) - \cos(\sqrt{Pe_g})}\right]$$

Figure 18:
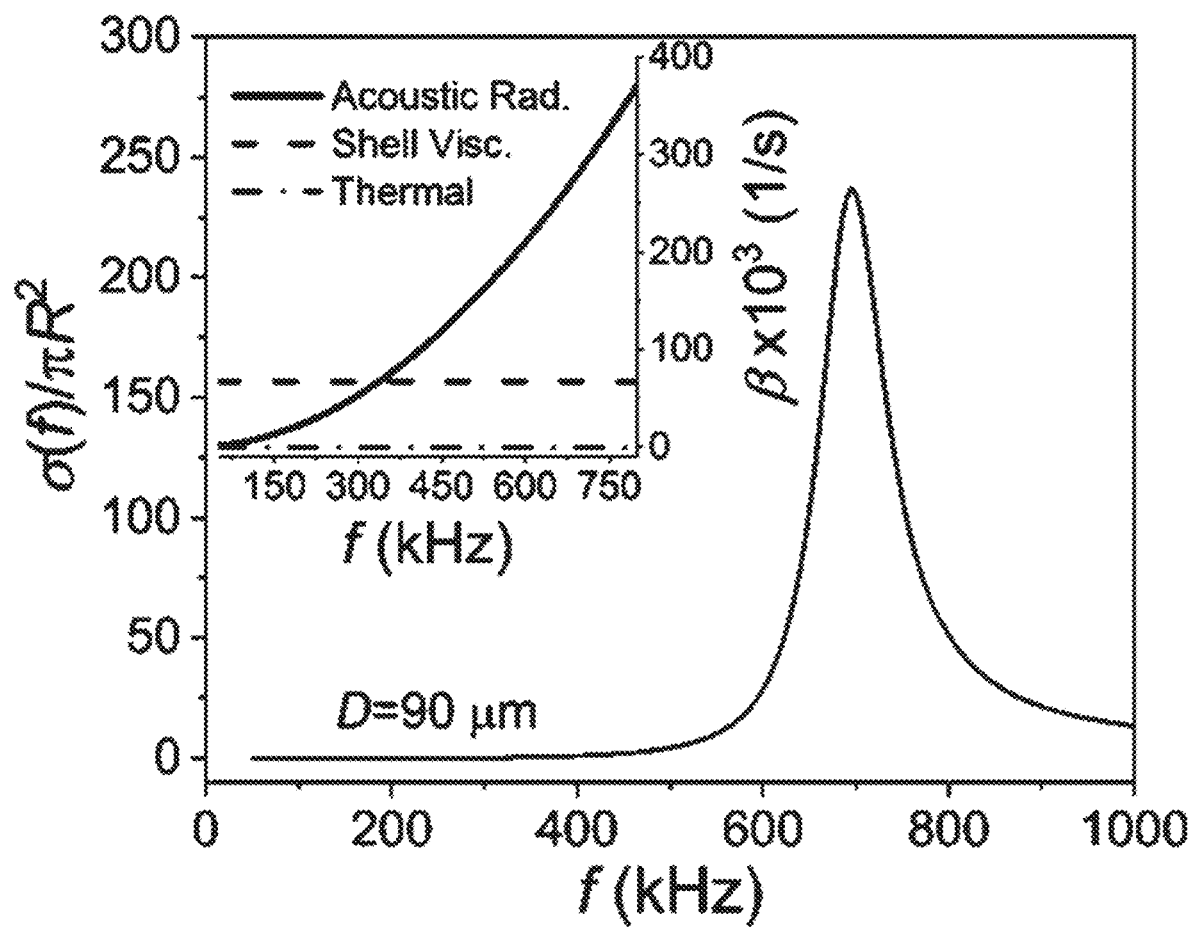
FIG. 18 shows predicted EMB scattering cross section $\sigma(f)$ (normalized to the shell outer radius) versus frequency f for D=90 μm accounting for acoustic radiation damping. Inset: damping coefficient $\beta$ as a function off for damping from acoustic radiation, EMB shell viscosity, and thermal effects.

FIG. 18 shows the predicted normalized EMB scattering cross section, which indicates a peak $\sigma(f)$ upon resonance. Here, $\sigma(f)$ is determined from the same EMB model as $f_O$ and accounts for acoustic radiation damping; the FIG. 18 inset shows acoustic radiation damping dominates the damping coefficient in the $f_O$ range of interest (400-800 kHz). For the undoped gel the longitudinal phase velocity was found to be $v_L$=1,498 m/s and at f=700 kHz $\lambda$=2,140 µm, which is a factor of 24 larger than D. Thus, the EMB is driven into resonant radial oscillations though A is over an order of magnitude larger than the equilibrium diameter [36].

Localization Phase Transitions in EMB-doped Gel—Normal incidence measurements are carried out in water. The sound level SL=20 $\log_{10}(P_t/P_{ref})$, attenuation coefficient $\alpha$, and scattering mean free path $l_S$ frequency spectra are obtained from the coherent part of the transmitted wavepacket, which is accessible by time-windowing the data; $P_t/P_{ref}$ is the amplitude transmission coefficient where $P_t$ and $P_{ref}$ are the transmitted and water reference pressure amplitudes, respectively, $I_S$ is determined from the normalized intensity $I/I_O = e^{-(L_G/l_S)}$ and $l_S = (2\alpha)^{-1}$; recall, $L_G$ is the doped gel thickness.

There was experimental access to the real-space transmitted and reflected pressures in response to an incident, nearly plane wave, and therefore to the Green's function G(x, t; $x_O$, $t_O$). From this quantity, in a model-independent manner, both the average Green's function $\langle G(x, t; x_O, t_O)\rangle$ (the coherent field) and correlation functions of the general form $\langle G(x, t; x_O, t_O) G(x',t'; x_O, t_O)\rangle$ can be evaluated. The latter quantity, related to energy transport, has been the main focus of localization investigations since Anderson's original work [1], as the coherent field vanishes exponentially at late times or large distances. The coherent field does, however, enable a measurement of the mean free path via the Fourier transform $|\langle G(x, \omega; x_O, \omega)\rangle| = G_O e^{-|x - x_O|/l_S}$ where $\omega$ is the angular frequency, which is valid away from the near field (note that $|\langle G(x, \omega; x_O, \omega)\rangle|^2 = |G_O|^2 e^{-|x - x_O|/l_S}$, which is equivalent to the expression provided for the normalized intensity). This relationship is common across all existing theoretical models of localization phenomena [3,7,9,37], and describes the scattering of energy from the coherent field by all physical mechanisms.

Figure 4:
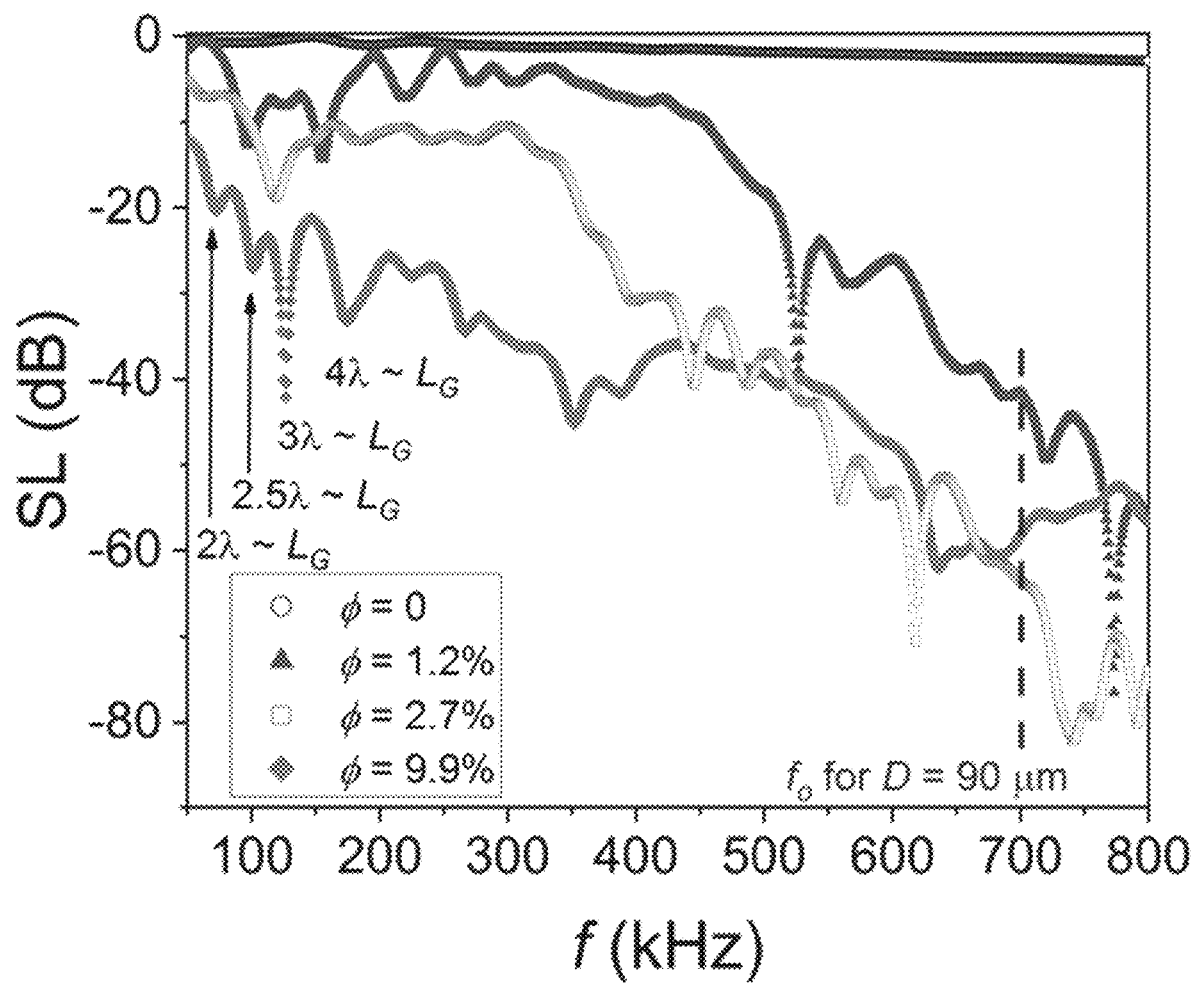
FIG. 4 shows SL (referenced to a water measurement) versus frequency f for an undoped sample (open circles), and three doped samples with EMB volume fractions $\phi=1.2\%$ (solid triangles), $\phi=2.7\%\pm0.5\%$ (open squares), and $\phi=9.9\%\pm1.8\%$ (solid diamonds). Several low-f thickness modes are indicated. The shaded region highlights the anticipated EMB resonance frequency range. A correction factor is applied to the data to account for the finite sample thickness: −0.64 dB for the undoped sample and −0.36 dB for the doped samples.

As seen in FIG. 4, significant reductions are observed in SL upon EMB doping beginning near the anticipated minimum $f_O$~360 kHz. The lowest SL corresponds to $\phi$=2.7% at f=742 kHz where the intensity transmission coefficient decreases eight orders of magnitude with respect to the water reference (accounting for a small impedance mismatch between the doped gel and water). The FIG. 4 doped gel data shows a clear transition in governing physics from the low-frequency regime where the transmission is governed by composite material properties resulting in thickness modes to higher frequencies where EMB oscillations drive the observed SL. With increasing frequency the number of resonant EMB diameters per wavelength (i.e. the disorder strength) increases, which partially explains the observed SL spectra at higher frequencies.

Figure 5:
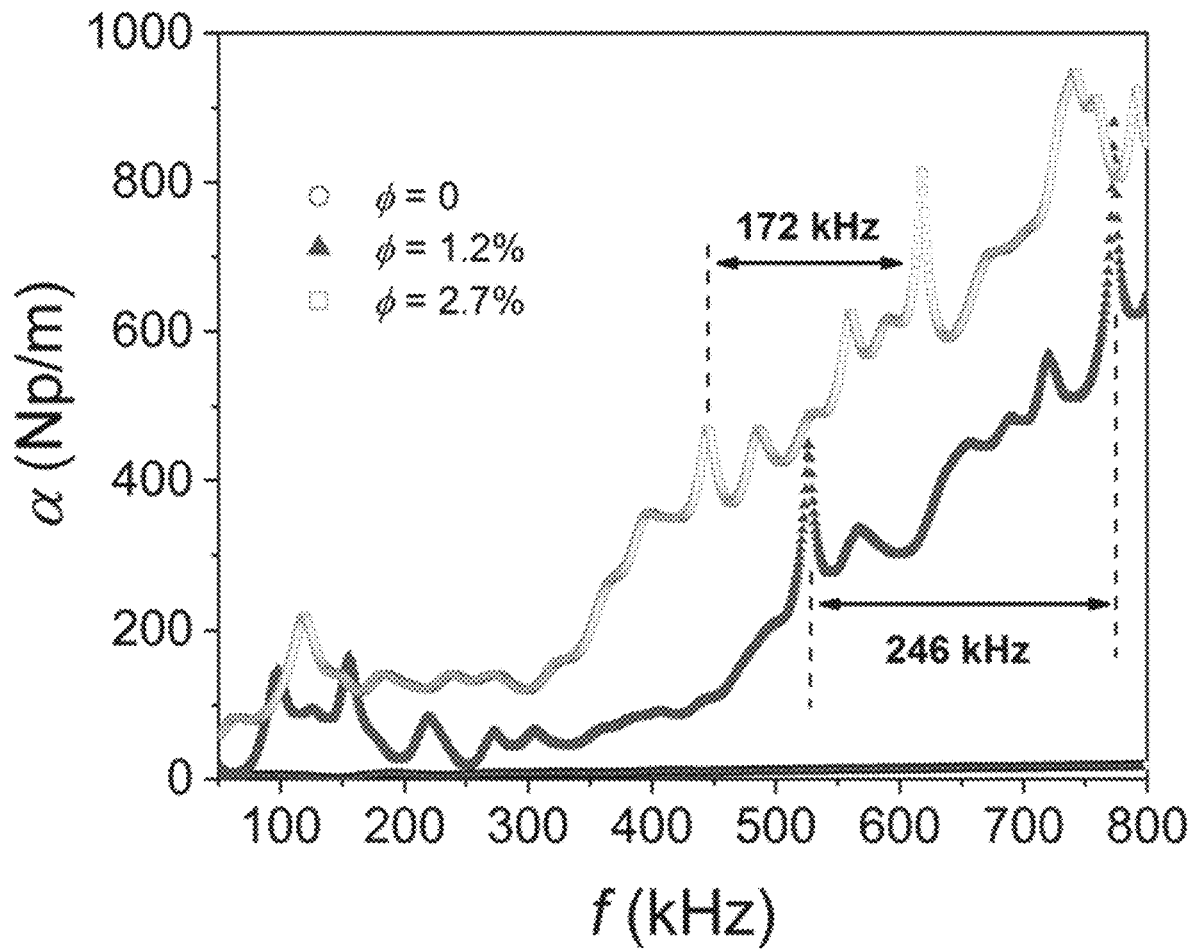
FIG. 5 shows attenuation coefficient $\alpha$ versus f for the undoped sample and two doped samples from FIG. 4. Dashed lines and arrows indicate the frequency ranges for the two localized phases, which are bounded by mobility edges (identified by attenuation peaks).

FIG. 5 shows $\alpha$ versus f where attenuation resonances with amplitudes exceeding 200 Np/m (unexplained by thickness modes) are observable above 400 kHz. The conclusion of anomalous attenuation at these frequencies is supported by reflection measurements (FIG. 19) where no resonant reflection is observed for f>400 kHz for any $\phi$. Based upon the FIGS. 4-7 data, as well as the diffusion and localization analysis (discussed later), several of these attenuation resonances have been determined to be mobility edges and they are indicated in FIG. 5 by dashed lines and arrows. The peaks shift toward lower frequency with increasing $\phi$ indicating a critical density for the phase transition. For the strongest lower-frequency mobility edge ($\phi$=1.2%, f=527 kHz), based upon the peak width, the EMB diameter distribution, and total density $\rho_{tot}$~5.6×10$^{10}$ EMBs/m$^3$, the critical density $\rho_C$~2.2×10$^9$ EMBs/m$^3$=0.09 k$^3$ is estimated. This $\rho_C$ is a factor of 2.2 larger than the minimum critical density $\rho_C$~1.0×10$^9$ scatterers/m$^3$ estimated with the criterion $l_S/\lambda \le 1$ from the early work of Ioffe and Regel [33]. The value of $\rho_C$ found here is also in close agreement with the results of numerical calculations both for a system of resonant point scatterers ($\rho_C$=0.08 $k^3$) [38] and for light scattering by cold atoms ($\rho_C$=0.1P) [39].

Though geometrical scattering is too weak to result in localization [62], theory suggests resonant scattering of small particles might lead to a localized phase provided a $\rho_C$ criterion is satisfied [53]. Considering the peak cross section in scattering from a monopole resonance damped only by acoustic radiation ($\sigma_{max} \sim \lambda^2/\pi$) then $d/\lambda \leq 1/3$ is sufficient to satisfy the criterion $kl_S \leq 1$, which is determined from $2\pi l_S/\lambda = 2\pi^2 d^3/\lambda^3$ where d is the average inter-scatterer spacing, $l_S = 1/\rho\sigma$, and $\rho = 1/d^3$. At f=527 kHz where a phase transition for $\phi=1.2\%$ is observed, $\sigma_L \sim 1,133$ m/s resulting in $\lambda \sim 0.0021$ m, and so if $d \leq 700$ μm then $\rho_C \geq 2.9 \times 10^9$ scatterers/$m^3$ would satisfy the criterion. For $\phi=1.2\%$, the critical density $\rho_C \sim 2.2 \times 10^9$ EMBs/$m^3$ is found, which is a factor of 1.3 less than the minimum critical density determined by adopting the criterion $kl_S \leq 1$.

However, if instead the criterion is $l_S/\lambda \leq 1$ is adopted from the early work of Ioffe and Regel [64] then $d/\lambda \leq 1/2$ is sufficient to satisfy the criterion. In this case, at f=527 kHz and for $\phi=1.2\%$, $d \leq 1.05$ mm and $\rho_C \geq 1.0 \times 10^9$ scatterers/$m^3$ would satisfy the criterion. Thus, the experimentally determined critical density $\rho_C \sim 2.2 \times 10^9$ EMBs/$m^3$ is a factor of 2.2 larger than the minimum critical density determined by adopting the criterion $l_S/\lambda \leq 1$.

Additionally, it is evident from FIG. 13 that the average value of d for $\phi=1.2\%$ is on the order of several 100 μm. Thus, the $\phi 5=1.2\%$ sample is a candidate for observing localization based upon a material density determined using the Ioffe-Regel $l_S/\lambda \leq 1$ criterion [64].

Figure 6:
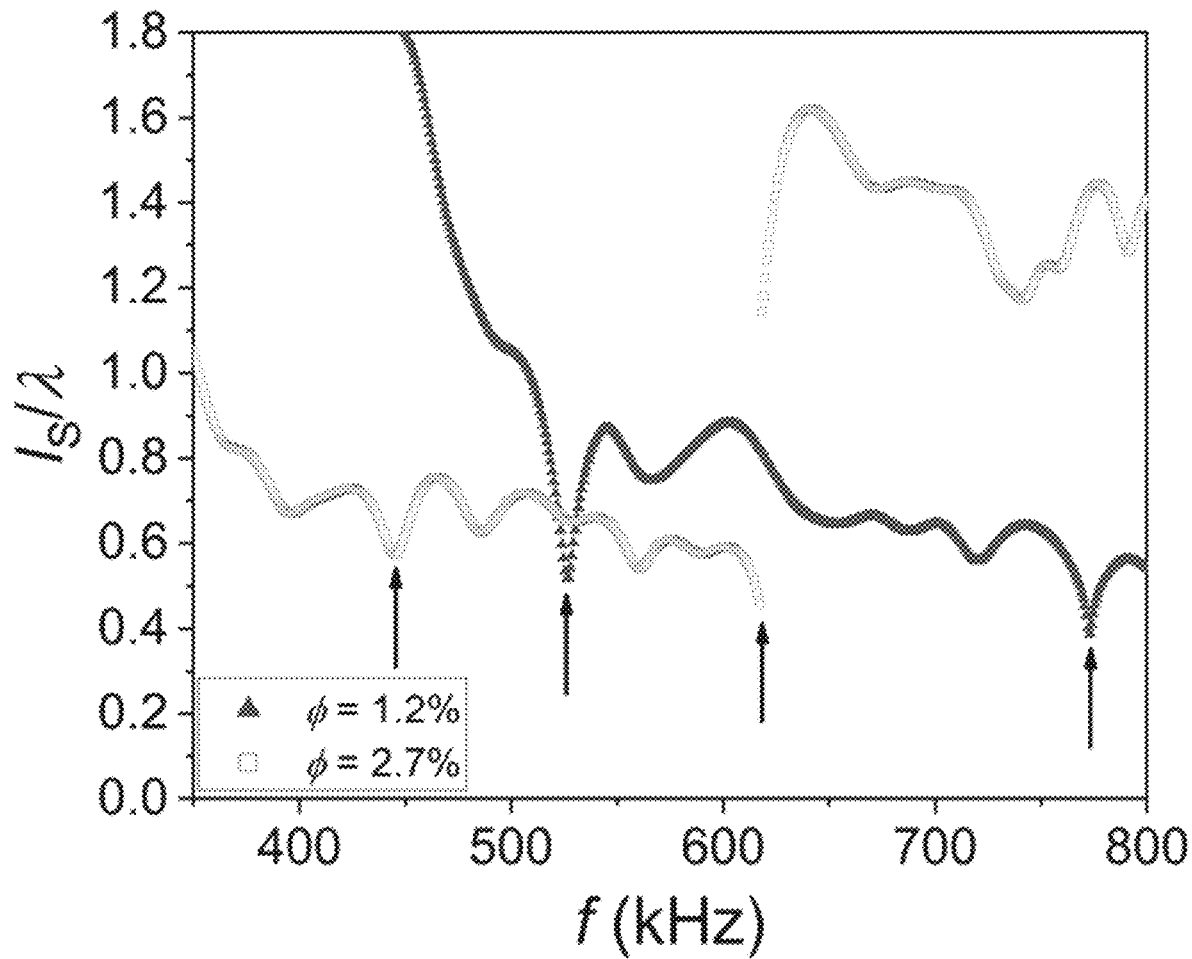
FIG. 6 shows the ratio of the scattering mean free path $l_S$ to the wavelength $\lambda$ versus f for the two doped samples in FIG. 5. The x-axis frequency range spans the anticipated range of EMB resonance frequencies. The arrows indicate the mobility edges (corresponding to the indicated $\alpha$ peaks in FIG. 5).

FIG. 6 shows $l_S/\lambda$ versus f for the same dopant concentrations presented in FIG. 5, and the mobility edges, corresponding to those frequencies at which $l_S/\lambda$ shows a sharp anomalous decay, are indicated by arrows. From the $\phi=1.2\%$ data set it is clear the transition to the localized phase, identified by the minimum at f=527 kHz, occurs when $l_S/\lambda$ falls below unity. The data for $\phi=2.7\%$ further shows that even if the criterion $l_S/\lambda \leq 1$ is satisfied the phase transition does not occur until $\rho=\rho_C$, which indicates both criteria must be met before the system transitions to a localized phase. Across samples, it is found that within the localized phase $l_S/\lambda$ never exceeds 1.0 and can be as low as 0.4. Further, for $\phi=2.7\%$ and at f=526 kHz (center of the phase) $l_S=1.0$ mm ($l_S/\lambda=0.65$), which is a factor ~9.2 larger than the equilibrium diameter for the EMB with that resonance frequency.

Figure 7:
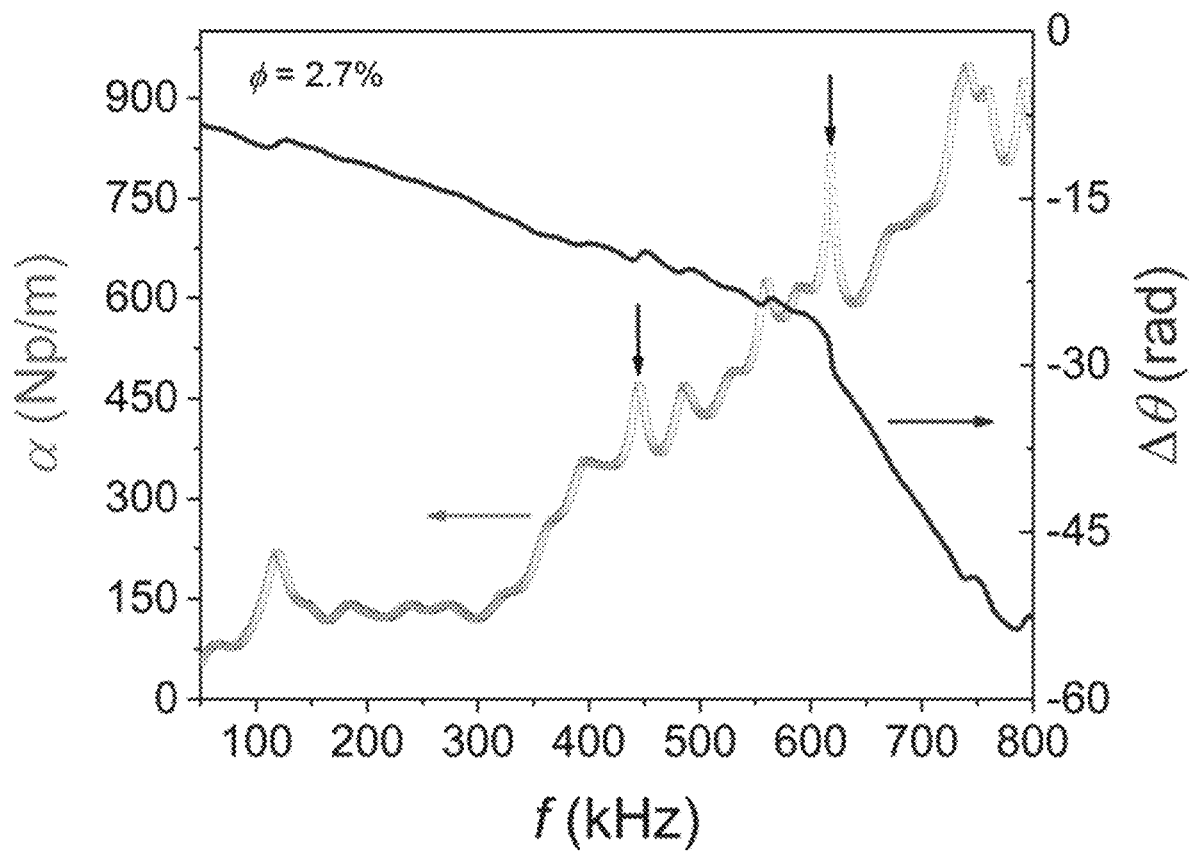
FIG. 7 shows $\alpha$ (left vertical axis) and change in the phase angle $\Delta\theta$ (right vertical axis) versus f for $\phi=2.7\%$. Note, the $\alpha$ spectrum in FIG. 7 is the same spectrum shown in FIG. 5. The arrows indicate the mobility edges.

Also shown in FIG. 6 is a discontinuity in $l_S/\lambda$ at f=618 kHz for $\phi=2.7\%$. The discontinuity occurs at the same frequency as an attenuation peak (the higher-frequency mobility edge) as seen in FIG. 7 where α is plotted along with the phase change $\Delta\theta$ (from which $\mu_L$ is determined). For f<618 kHz waves are localized while for f>618 kHz $l_S/\lambda$ saturates to values around 1.4. Also, for f>618 kHz $v_L$ is lowered by a factor of 2.5 and this slowing suggests a transition to a different transport regime; it is suspected that this higher frequency regime above the second mobility edge is primarily governed by the wave's small spatial extent at those frequencies [20] and by the EMB enclosed gas because gaseous isobutane and pentane have wave speeds ~200 m/s [40,41], which is comparable to the measured $v_L$=334 m/s in this higher-frequency regime, and also because even at these higher frequencies the EMB frequency-dependent concentration is still near the maximum in the D distribution shown in FIG. 16. Nevertheless, the $l_S/\lambda$ discontinuity provides experimental evidence of a finite frequency range for the localized phase in agreement with predictions for scalar wave localization [8,20-22]; the phase occurs for frequencies between the indicated attenuation peaks in FIG. 5 and the corresponding $l_S/\lambda$ minima in FIG. 6. Following the same procedure used to determine $\rho_C$, the scatterer density is estimated as $\rho \sim 0.05$ $k^3$ at f=773 kHz for $\phi=1.2\%$, which suggests the higher-frequency transition to extended states might also occur because p does not increase as $f^3$.

The mean free path is not expected to contain an indication of Anderson localization as the interference responsible for this phenomena appears only in the higher-order averages <GG . . . >; this well-known expectation is again true across all existing theoretical models [3,7,9,37,42]. From first principles with no weak-coupling approximations, field theoretic methods applied to a Gaussian distribution, random collection of point scatterers demonstrate that the spontaneous symmetry breaking leading to diffusive behavior, and a breakdown of perturbative expansions, does not occur in the calculation of the mean Green's function [7,9]. Thus, the renormalized diffusion responsible for Anderson localization is not accessible in the measurement of the mean Green's function, and hence not in the mean free path. While this was found to be the case in the localized phase, nevertheless strong anomalies were observed in the mean free path at the mobility edges separating localized and extended states (with the mobility edge identification supported by late-time analysis of the higher-order Green's functions, as discussed later). It is believed that this observation of the anomalous behavior for the mean free path, which serves as a clear experimental signature of the mobility edge, is associated with the notion that our system contains a macroscopic number of internal degrees of freedom (resonances). The presence of such resonances generally leads to a slowing of the diffusive energy velocity in the perturbative models [43-46] and has only been briefly considered in a field-theoretic context [47]; however, these works do not examine potential effects associated with a near vanishing mean free path at the mobility edge.

Figure 20:
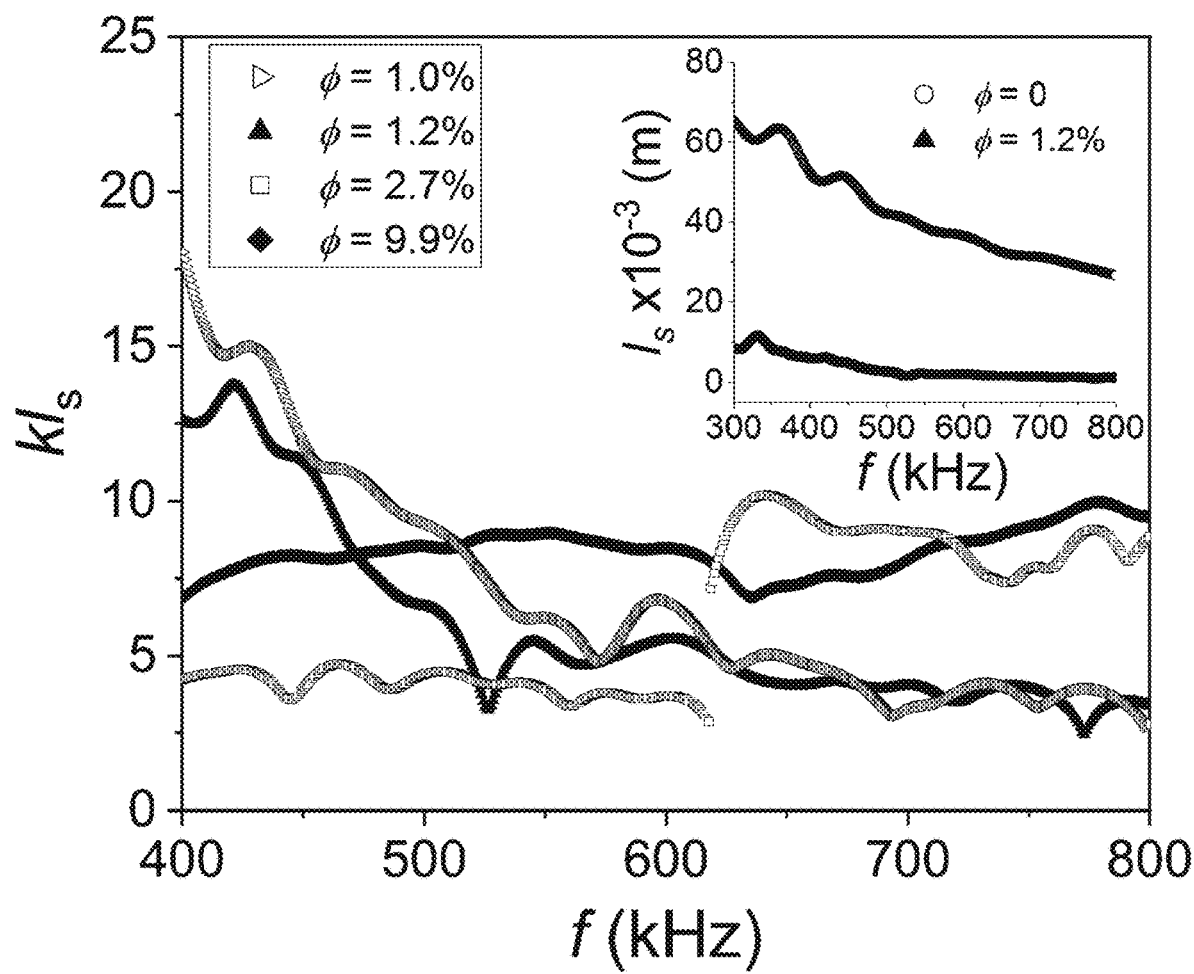
FIG. 20 shows the product of the effective wavenumber k and the scattering mean free path $l_S$ versus f for the four EMB volume fractions: $\phi=1.0\%$ (open triangles), $\phi=1.2\%$ (solid triangles), $\phi=2.7\%$ (open squares), and $\phi=9.9\%$ (solid diamonds). Inset: $l_S$ versus f for the undoped sample and $\phi=1.2\%$. Here, $l_S$ for the undoped sample is determined to be at least a factor of three larger than the gel thickness $L_G$ across the full experimental frequency range.

The lowest $kl_S$ values occur for frequencies associated with the distribution of EMB $f_O$ (see FIG. 20). At the low-frequency mobility edge $kl_S$=3.2±0.1 and $kl_S$=3.6±0.1 for $\phi=1.2\%$ and 2.7%, respectively, while between the mobility edges and in the localized phase the minimum $kl_S$=2.4±0.1 and $kl_S$=2.9±0.1 for $\phi=1.2\%$ and 2.7%, respectively. The $kl_S$ values found here are comparable to values found for sound localization in mesoglasses [26-28].

Figure 21:
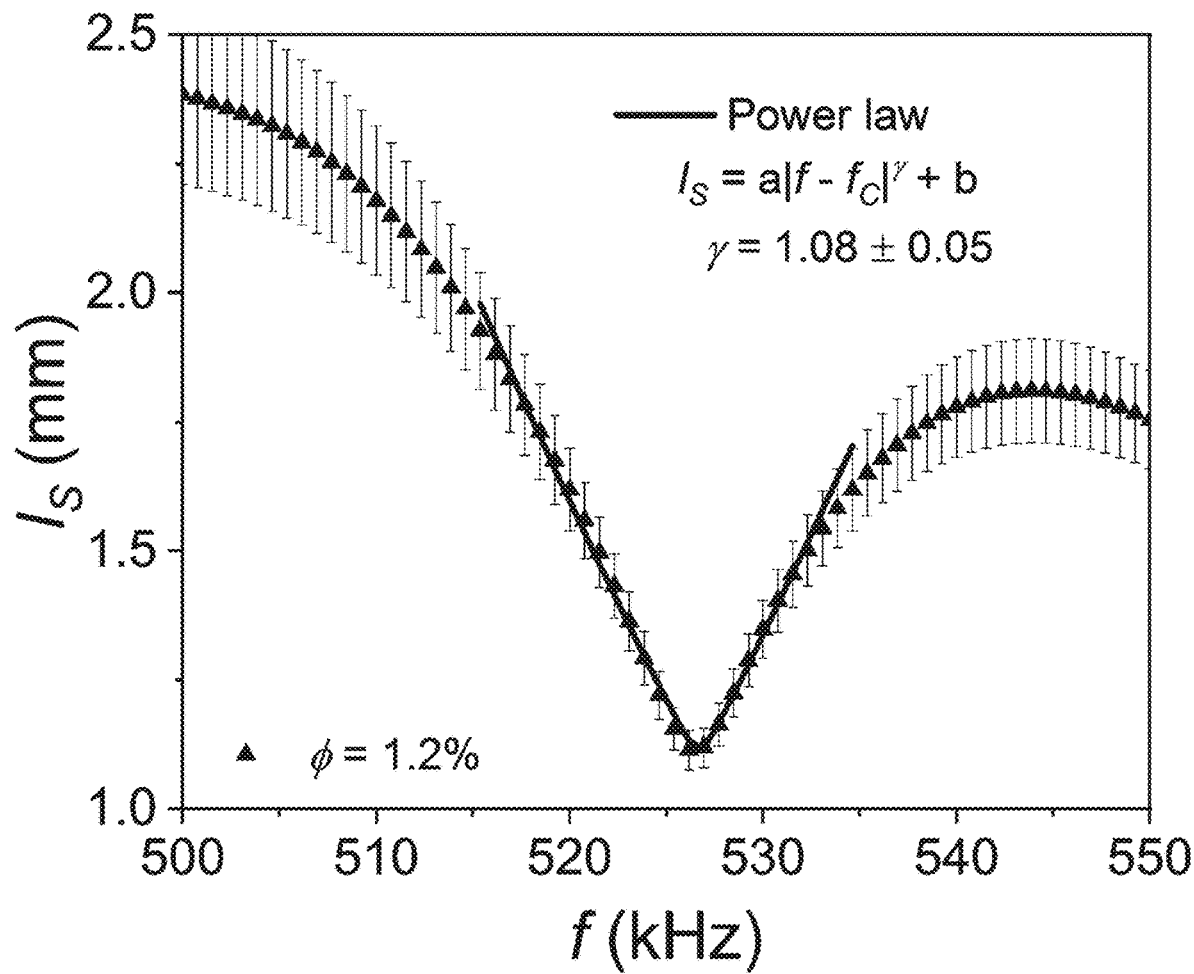
FIG. 21 shows scattering mean free path $l_S$ versus frequency f for $\phi=1.2\%$ at the 527 kHz mobility edge. Note, the data shown here is the same data set shown in FIG. 6. The solid line is a fit to the power law shown in the graph's legend with $R^2=0.995$, which yields the critical exponent $\gamma=1.08\pm0.05$.

FIG. 21 shows $l_S$ versus f near the mobility edge at f=527 kHz for $\phi=1.2\%$. Clearly, $l_S$ decreases rapidly in the vicinity of the critical frequency $f_C$ at which the phase transition occurs, and this rapid decrease in $l_S$ obeys the power law $l_S=\alpha|f-f_C|^\gamma+b$ with the critical exponent $\gamma=1.08\pm0.05$ (an additional power law fit to the mobility edge at f=773 kHz shown in FIG. 6 for $\phi=1.2\%$ yielded $\gamma=1.01\pm0.11$). The divergence of a scaling parameter is a key property of the Anderson transition: scaling arguments derived from perturbative expansions predict such a power law behavior for the rapid decrease of the conductivity at the Anderson transition in disordered electronic system [3], while numerical calculations predict such a behavior for the divergence of the correlation and localization lengths at the transition [48,49], and dynamical localization measurements with matter waves find a power law behavior for the scaling parameter on both sides of the transition [18]. However, the critical exponent found here applies to the mean free path in a weakly dissipative medium, which distinguishes the exponent from those determined through numerical calculations for the correlation and localization lengths [48,49] in non-dissipative systems. The value $\gamma=1.08$ found here should thus be interpreted as a measure of the is renormalization critical exponent and not as a claim of a measured correlation length critical exponent.

Wave Propagation at the Mobility Edge—At late-times, diffusion sets in unless the system has passed through a localization transition [50,51]. To study late-time behavior of the transmitted energy a narrow impulse was used with $\Delta t<10$ μs. FIG. 22 shows P vs t for $\phi=1.2\%$ across multiple speckles. The coherent field (260 μs<t<268 μs) is speckle independent. However, a strong incoherent field is observed for t>269 μs, which varies across speckles and shows temporal fluctuations that vary on a time scale corresponding to the input wavepacket. The temporal fluctuations are highlighted in FIG. 23 where the data was time-windowed to remove the coherent field. Such fluctuations are the result of wave interference along multiple scattering paths [52-54].

Figure 19:
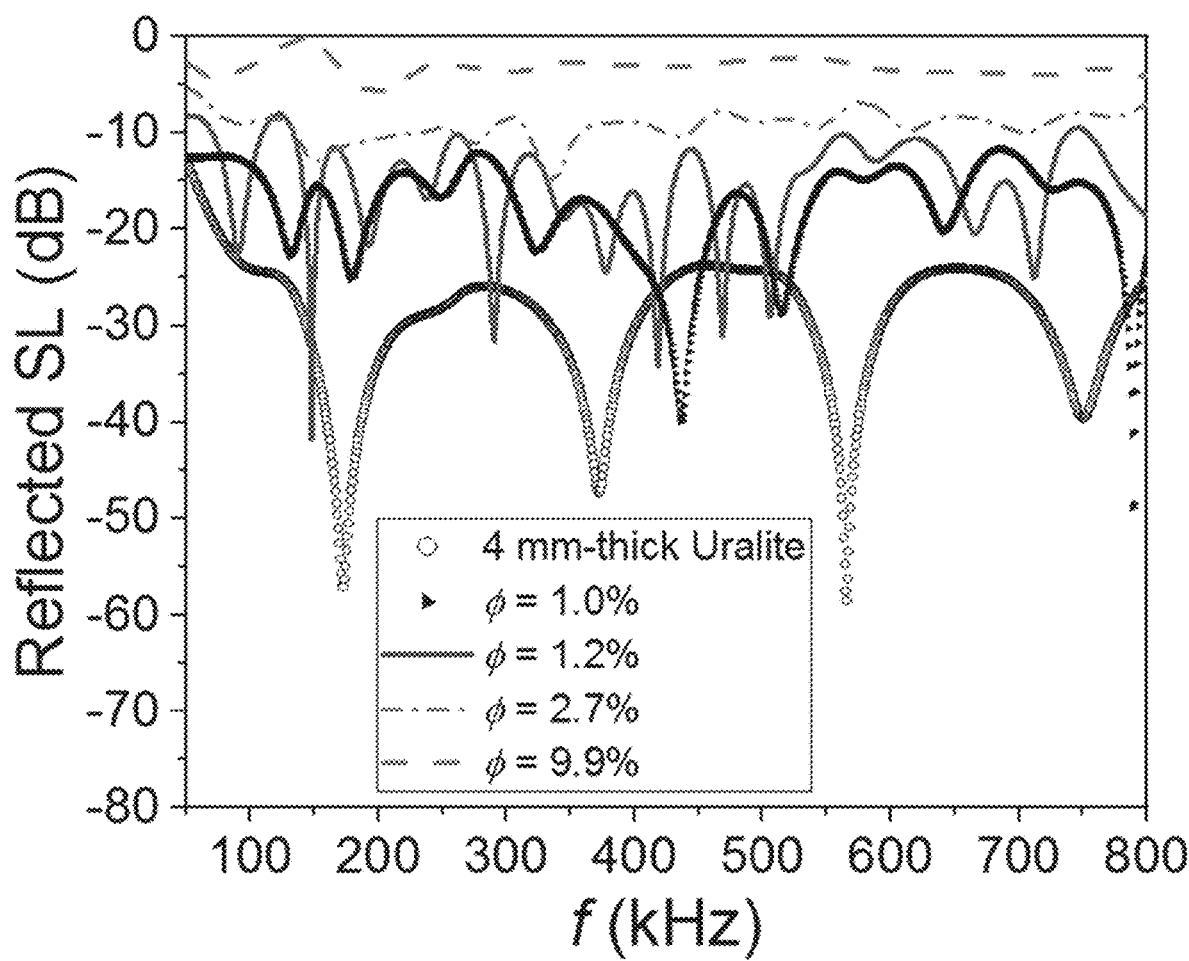
FIG. 19 shows reflected sound level (SL) versus frequency f for a 4 mm-thick Uralite sample (open circles), and for four EMB volume fractions: $\phi=1.0\%$ (solid triangles), $\phi=1.2\%$ (solid line), $\phi=2.7\%$ (dashed/dotted line), and $\phi=9.9\%$ (dashed line). Correction factors have been applied to account for the measurement range: 6.62 dB for the Uralite sample, and 6.46 dB for the doped samples.
Figure 24:
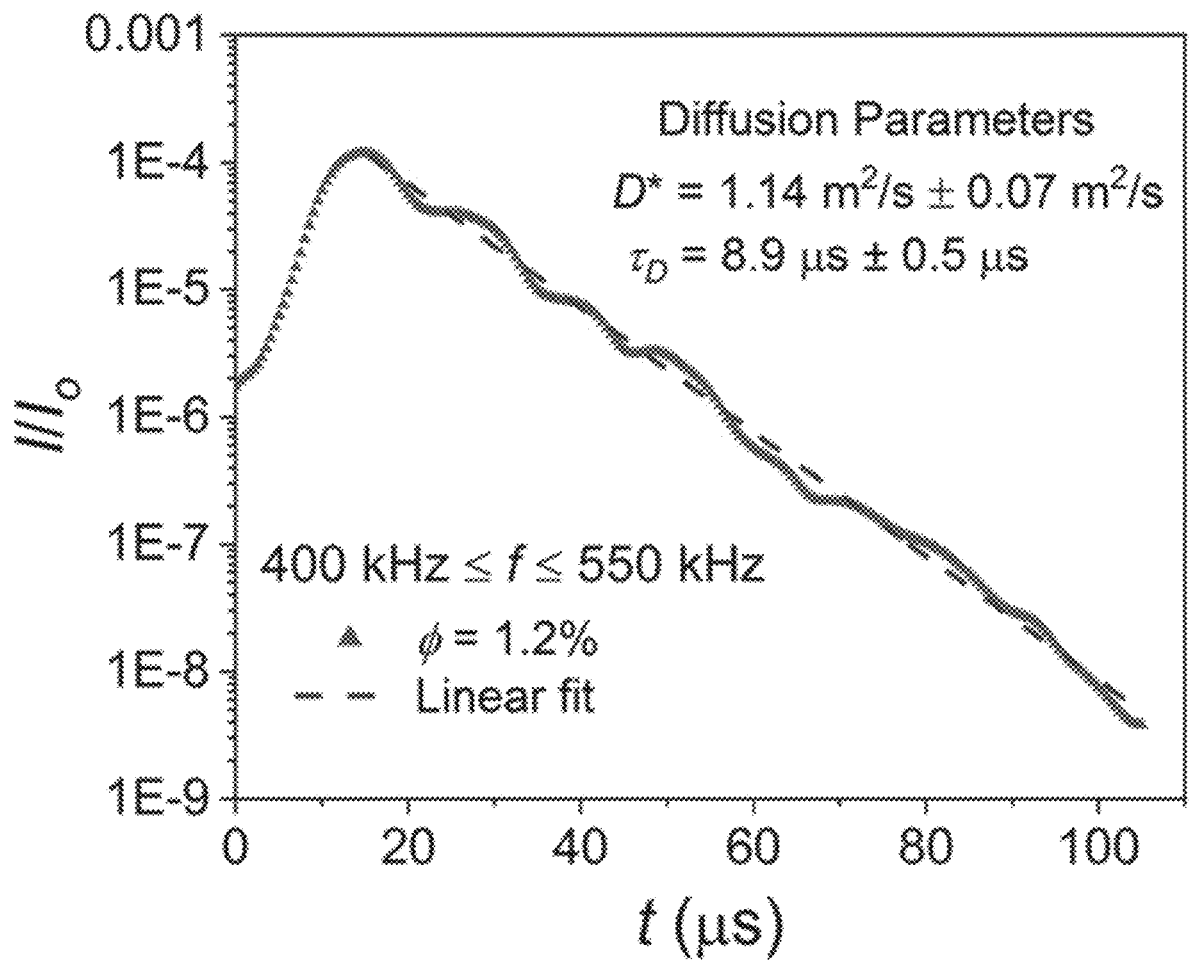
FIG. 24 shows normalized transmitted intensity peak envelope $I/I_O$ versus t for $\phi=1.2\%$ after digitally filtering the data in FIG. 23 to include the 400-550 kHz range. Here, $I/I_O$ is found from averaging over 11 different speckle measurements. Normalization is done so the input pulse peak is unity. The dashed line is a linear fit to the data.

FIG. 24 shows $I/I_O$ for $\phi=1.2\%$ after digitally filtering the FIG. 23 data to include the 400-550 kHz frequency range; note the frequency range was chosen to target the lower range of EMB resonance frequencies up to the high-frequency side of the f=527 kHz $l_S/\lambda$ minimum in FIG. 6 (i.e. the low-f mobility edge). Here, $I/I_O$ is averaged over 11 speckles where $I=P_t^2(2\rho_G v_L)^{-1}$ is computed for each speckle based upon $P_t$, the doped gel density $\rho_G$, and $\mu_L$. Classically, $I/I_O$ decays according to the exponential law $I/I_O=e^{-t/\tau_D}$, where $\tau_D^{-1}$ is the lowest eigenvalue of the diffusion operator $-D\nabla\nabla^2$[55], and the FIG. 24 data shows excellent agreement to an exponential model. From the linear fit shown in FIG. 24 a characteristic diffusion time $\tau_D=8.9$ μs±0.5 μs is obtained, which yields a diffusion coefficient $D^*=L_G^2(\tau_D\pi^2)^{-1}=1.14$ m$^2$/s±0.07 m$^2$/s. The values found here for $\tau_D$ and $D^*$ yield a diffusion length $l_D=(D^*\tau_D)^{1/2}=3$ mm, which is more than a factor of 3 smaller than $L_G$. Diffusion occurs in the samples in this frequency range (400-550 kHz) because while the doped gel is a strongly scattering medium, the $l_S/\lambda$ and $\mu_C$ criteria for localization are not satisfied. The analysis is expected to be weakly dependent on internal reflections since the ratio of the penetration depth $z_O$ to the doped gel thickness $z_O/L_G=K$ can be more than an order of magnitude less than unity where $K=2l_S(1+R)/3L_G(1-R)$ and the internal reflectivity R is estimated by averaging over the reflected sound level within the 50-800 kHz range (FIG. 19). Furthermore, absorption is not expected to skew the late-time diffusion (or localization) analysis as the characteristic absorption time $\tau_\alpha$ found from fitting the $\phi 5=1.2\%$ data within the localized phase to the localization self-consistent theory is significantly higher than $\tau_D=8.9$ μs and also because a value $\tau_\alpha\leq 10$ μs is not consistent with the experimental data at late times across the full range of $\phi$ studied here (see below).

Figure 25:
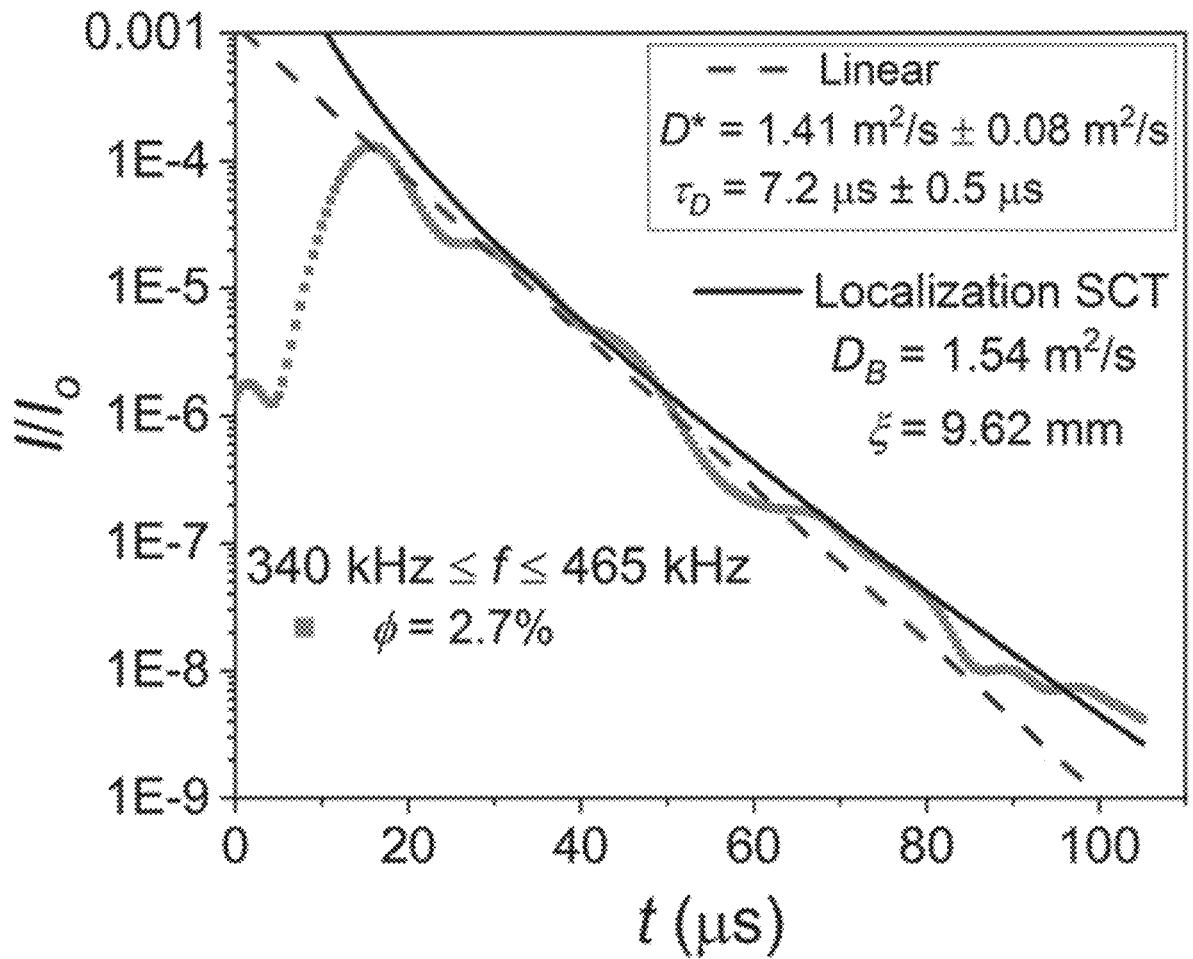
FIG. 25 shows $I/I_O$ versus t for $\phi=2.7\%$ and for the 340-465 kHz range. Here, $I/I_O$ is found from averaging over 11 different speckle measurements. The dashed line is the result of a linear fit to the data similar to that shown in FIG.

With increasing $\phi$, noticeable late-time deviations are found from diffusion for frequencies near and at the mobility edge as evident by the $\phi=2.7\%$ data set in FIG. 25. Here, the frequency range was again chosen to target the lower range of EMB resonance frequencies up to the high-frequency side of the f=445 kHz $l_S/\lambda$ minimum in FIG. 6. The FIG. 25 data indicates the onset of a time-dependent reduction of the diffusion coefficient. A fit of the FIG. 25 data to the phenomenological self-consistent theory (SCT) of localization [50] where at late times in the Anderson localized regime the average transmission coefficient is given by $T(t)\sim e^{-\eta t/p+1}$. Here, $\eta=(D_B/\xi^2)\exp(-L_G/\xi)$, $D_B$ is the bare diffusion coefficient, and $\xi$ is the localization length. The restriction $0.5\leq p\leq 1.0$ yields $\xi=9.62$ mm and $D_B$ comparable to $D^*$. The value of $\xi$ found here is a factor of 5 larger than the lowest value found for the localized phase. That $\xi$ is found to be nearly equal to $L_G$ in this frequency range agrees with a statistical interpretation of localization: a range of localization lengths exist in the sample and even though $\xi$ diverges at the mobility edge the finite sample dimensions restrict the measurement of closed loops of wave transport to length scales less than the sample thickness (as pointed out in Ref 24). Additionally, the SCT fit shown in FIG. 25 accounts for absorption and yields $\tau_\alpha\sim 2\tau_D$, which represents a marked decrease in $\tau_\alpha$ at the mobility edge with respect to that found for the localized phase. This reduction in $\tau_\alpha$ at the mobility edge is consistent with a renormalization group theory in $2+\varepsilon$ dimensions [8], which predicts an anomalous rise in attenuation (absorption) of the incoherent field due to fluctuations in the wave diffusivity as the mobility edge associated with the Anderson transition is approached from the conducting side. Therefore, the value of $\tau_\alpha$ found here is attributed to the change in the fundamental nature of wave propagation as the system approaches the mobility edge. That the late-time behavior observed in FIG. 25 accompanies an anomalous rise in attenuation (consistent with Ref 8) and yields $\xi\sim L_G$ suggests the deviation from diffusion shown in FIG. 25 is primarily due to fluctuations in wave diffusivity and represents the onset of a localized phase.

Intensity Transmission in the Localized Phase—Next the late-time behavior is considered for frequencies between the $l_S/\lambda$ minima identified as mobility edges in FIG. 6. Further, late-time data is presented for an additional sample with $\phi=1.0\%\pm 0.6\%$ (the $\alpha$ spectrum for this sample is provided in FIG. 26). Similar to the late-time behavior observed in FIG. 25, the data presented in FIGS. 27-29 also shows late-time deviations from diffusion, which is a hallmark of localization. Each of the FIGS. 27-29 data sets are well-fitted by the SCT, and from these SCT fittings $\xi$ is found to be at least a factor of 4 times smaller in the localized phase than near the mobility edge and also comparable to $\lambda$ indicating waves are localized to a length scale comparable to the wavelength; for $\phi=2.7\%$ and at f=490 kHz $\xi/\lambda=1.1$ and the ratio $\xi/\lambda$ is found to depend on both $\phi$ and f. As evident from the FIGS. 27-29 data, stronger late-time deviations from diffusion with increasing $\phi$ are found, which is accompanied by a reduction in $\xi$ to a length scale a factor of 5.2 smaller than the doped gel thickness. Within the localized phase $z_O\sim 9.0\times 10^{-4}$ m for $\phi 5=1.2\%$, which suggests wave localization occurs in the doped gel beyond a small penetration depth. The SCT fittings shown in FIGS. 27-29 account for absorption and yield absorption times $\tau_\alpha\geq 100$ μs and absorption lengths $l_\alpha\geq 62$ mm, which suggests negligible absorption within the localized phase.

Also shown in FIGS. 27-29 are SCT predictions for when $\tau_\alpha\sim\tau_D$: the dashed lines correspond to setting $\tau_\alpha=10$ μs with all other parameters kept as specified for each $\phi$. If $\tau_\alpha=10$ μs then the SCT cannot account for the observed late-time deviations from linearity shown in FIGS. 27-29. This provides supporting evidence that $\tau_\alpha$ is indeed greater than 10 μs, that the values of $\tau_D$ shown in FIGS. 24 and 25 are not due to absorption, and that absorption does not skew the observation of localization effects. For $\tau_\alpha>2\tau_D$ it is found that the change in $\xi$ determined from the SCT fittings to the data is less than the experiment's spatial resolution.

A significant increase in $D_B$ with respect to $D^*$ in the diffusive regime is found, which is consistent with observations of sound localization in mesoglasses [27]. Interestingly, values for $D_B$ found here vary at most 13% across samples from 33.35-38.70 m$^2$/s. Though one might expect a decrease in $D_B$ with increasing $\phi$ since $D_B=(\frac{1}{3})v_E l_S=(\frac{1}{3})v_E(\rho\sigma)^{-1}$ where $v_E$ is the energy velocity, differences in the average $l_S$ across samples (both at the mobility edge and in the localized phase) are less than the experiment spatial resolution, which might suggest negligible changes are expected for $D_B$ within the range of ϕ studied here (assuming a constant $v_E$). Additional estimates for $l_S$ within the different regimes (i.e. at the mobility edge and in the localized phase) based upon $(\rho\sigma)^{-1}$, the known diameter distribution, and σ predicted with EMB theory [29] confirm the expected constant $D_B$ across the measured ϕ range. The value of $v_E$ found here is only a factor 1.25 larger than the value found in Ref. 27.

From the data analysis accompanying FIGS. 22-29 it is clear the $l_S/\lambda$ minimum at f=527 kHz in FIG. 6 for ϕ=1.2% separates the frequency ranges associated with diffusion and localization, which supports the conclusions that the minimum occurs at the mobility edge and the localized phase extends over the specified frequency range. Comparable widths are found for each mobility edge attenuation peak shown in FIG. 5 ($\Delta$f~40-50 kHz), which further suggests a common origin. The data also indicates a localization transition originating from the localized phase is also accompanied by an anomalous decay of the mean free path, and that the observed attenuation resonances and $l_S/\lambda$ minima provide an experimental signature of the mobility edge. For ϕ=9.9%±1.8% the broad minimum in SL versus f in FIG. 4 centered upon 636 kHz and spanning 613-782 kHz corresponds to a mobility edge with $\rho_C$~0.09 $k^3$. This demonstrates a significant mobility edge variation with increasing disorder (in agreement with Ref 17). The mobility edge shift to lower frequencies observed in FIG. 5 suggests the ϕ=9.9% SL minimum at 350 kHz might also a mobility edge, and further work is required to shed light on the results in the high-ϕ limit.

It is interesting that localization effects are observed despite the values for $kl_S$ being greater than 1 (true for this work and also prior studies). Theoretical works predicting a critical density for scalar wave localization within a system of resonant point scatterers [38] have suggested that in such a system the Ioffe-Regel criterion $kl_S$~1 is only valid qualitatively and cannot be used as a quantitative condition for Anderson localization in three-dimensions; this has been attributed primarily to the coherent wavepacket being strongly affected by the effective medium's spatial dispersion, which prevents the definition of the mean free path and effective wave number in the conventional way. That the critical density found here is in agreement with that predicted for a system of resonant point scatterers suggests a non-negligible contribution from the medium's spatial dispersion on the coherent wavepacket.

Also, in prior work on sound localization in mesoglasses [28] stronger localized behavior was found near a minimum in the amplitude transmission coefficient with mobility edges on either side of the minimum (determined via SCT fittings). This, however, is quite different from the results here in that stronger localized behavior is found away from the $l_S/\lambda$ minima identified as mobility edges as opposed to near the minima: for example, the frequency range shown in FIG. 28 begins at a frequency more than 70 kHz higher than the minimum in $l_S/\lambda$. Additionally, evidence of strong attenuation of the incoherent wave at the mobility edge due to fluctuations in the wave diffusivity is found, and this result is absent in the mesoglass literature. The discrepancies could most likely be due to the differences in the unique systems themselves for here the frequency-dependent disorder strength is generated through variations in EMB resonance frequencies and topological disorder while for the case of the mesoglass samples the disorder is generated by variations in the weak couplings between brazed aluminum beads.

In summary, this work demonstrates broadband control of sound localization and phase transitions in soft matter. Localized phases as broad as 246 kHz are observed, which are separated from extended states by mobility edges. The phase transition is found to be accompanied by a strong anomalous decrease of the mean free path at the mobility edge. The critical density needed for the localized phase was determined and evidence found of a new transport regime at the highest frequencies used in the experiments and above the critical frequency at which the system transitions out of the localized phase.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

REFERENCES

1. Anderson, P. W. Absence of diffusion in certain random lattices. *Phys. Rev.* 109, 1492-1505 (1958).
2. Lagendijk, A., van Tiggelen, B. & Wiersma, D. S. Fifty years of Anderson localization. *Phys. Today* 62, 24-29 (2009).
3. Abrahams, E., Anderson, P. W., Licciardello, D. C. & Ramakrishnan, T. V. Scaling theory of localization: absence of quantum diffusion in two dimensions. *Phys. Rev. Lett.* 42, 673-676 (1979).
4. Last, B. J. & Thouless, D. J. Evidence for power law localization in disordered systems. *J. Phys. C: Solid State Phys.* 7, 699-715 (1974).
5. Mott, N. E. Metal-insulator transitions. *Phys. Today* 31, 42-47 (1978).
6. Evers, F. & Mirlin, A. D. Anderson transitions. *Rev. Mod. Phys.* 80, 1355-1417 (2008).
7. Wegner, F. The mobility edge problem: continuous symmetry and a conjecture. *Z Physik B* 35, 207-210 (1979).
8. John, S. Electromagnetic absorption in a disordered medium near a photon mobility edge. *Phys. Rev. Lett.* 53, 22 (1984).
9. Efetov, K. B. Supersymmetry and theory of disordered metals. *Adv. Phys.* 32, 53-127 (1983).
10. Belitz, D. & Kirkpatrick, T. R. The Anderson-Mott transition. *Rev. Mod. Phys.* 66, 261-380 (1994).
11. Basko, D. M., Aleiner, I. L. & Altshuler, B. I. Metal-insulator transition in a weakly interacting many-electron system with localized single-particle states. *Ann. Phys.* 321, 1126-1205 (2006).
12. Vollhardt, D. & Wölfle, P. in *Electronic Phase Transitions* (eds Hanke, W. & Kopaev, Yu. V.) 1-78 (Elsevier, 1992).
13. Lee, P. A. & Ramakrishnan, T. V. Disordered electronic systems. *Rev. Mod. Phys.* 57, 287-337 (1985).
14. Kramer, B. & Mackinnon, A. Localization: theory and experiment. *Rep. Prog. Phys.* 56, 1469-1564 (1993).
15. Kondov, S. S., McGehee, W. R., Zirbel, J. J., & DeMarco, B. Three-dimensional Anderson localization of ultracold matter. *Science* 334, 66-68 (2011).
16. Jendrzejewski, F. et al. Three-dimensional localization of ultracold atoms in an optical disordered potential. *Nat. Phys.* 8, 398-403 (2012).

17. Semeghini, G., et al. Measurement of the mobility edge for 3D Anderson localization. *Nat. Phys.* 11, 554-559 (2015).
18. Pasek, M., Orso, G., & Delande, D. Anderson localization of ultracold atoms: where is the mobility edge? *Phys. Rev. Lett.* 118, 170403 (2017).
19. Chatbé, J., Lemarié, G., Grémaud, B., Delande, D., Szriftgiser, P., & Garreau, J. C. Experimental observation of the Anderson metal-insulator transition with atomic matter waves. *Phys. Rev. Lett.* 101, 255702 (2008).
20. Kirkpatrick, T. R. Localization of acoustic waves. *Phys. Rev. B* 31, 5746-5755 (1985).
21. Sheng, P., & Zhang Z.-Q. Scalar-wave localization in a two-component composite. *Phys. Rev. Lett.* 57, 1879-1882 (1986).
22. Condat, C. A. & Kirkpatrick, T. R. Observability of acoustical and optical localization. *Phys. Rev. Lett.* 58, 226-229 (1987).
23. Storzer, M., Gross, P., Aegerter, C. M. & Maret, G. Observation of the critical regime near the Anderson localization of light. *Phys. Rev. Lett.* 96, 063904 (2011).
24. Sperling, T., Bürer, W., Aegerter, C. M. & Maret, G. Direct determination of the transition to localization of light in three dimensions. *Nat. Photon.* 7, 48-52 (2013).
25. Sperling, T., Schertel, I., Ackermann, M., Aubry, G. J., Aegerter, C. M. & Maret, G. Can 3D light localization be reached in white paint? *New J. Phys.* 18, 013039 (2016).
26. Cobus, L. A., Skipetrov, S. E., Aubry, A. van Tiggelen, B. A., Derode, A. & Page, J. H. Anderson mobility gap probed by dynamic coherent backscattering. *Phys. Rev. Lett.* 116, 193901 (2016).
27. Hu, H., Strybulevych, A., Page, J. H., Skipetrov, S. E. & van Tiggelen, B. A. Localization of ultrasound in a three-dimensional elastic network. *Nat. Phys.* 4, 945-948 (2008).
28. Cobus, L. A., Hildebrand, W. K., Skipetrov, S. E., van Tiggelen, B. A., & Page, J. H. Transverse confinement of ultrasound through the Anderson transition in three-dimensional mesoglasses. *Phys. Rev. B* 98, 214201 (2018).
29. Chen, J., Hunter, K. S. & Shandas, R. Wave scattering from encapsulated microbubbles subject to high-frequency ultrasound: contribution of higher-order scattering modes. *J. Acoust. Soc. Am.* 126, 1766-1775 (2009).
30. Khismatullin, D. B. Resonance frequency of microbubbles: effect of viscosity. *J. Acoust. Soc. Am.* 116, 1463-1473 (2004).
31. Khismatullin, D. B. & Nadim, A. Radial oscillations of encapsulated microbubbles in viscoelastic liquids. *Phys. Fluids* 14, 3534-3557 (2002).
32. Skipetrov, S. E. & Sokolov, I. M. Absence of Anderson localization of light in a random ensemble of point scatterers. *Phys. Rev. Lett.* 112, 023905 (2014).
33. Ioffe, A. F. & Regel, A. R. Non-crystalline, amorphous, and liquid electronic semiconductors. *Prog. Semicond.* 4, 237 (1960).
34. Korneev, V. A. & Johnson, L. R. Scattering of P and S waves by a spherically symmetric inclusion. *Pure Appl. Geophys.* 147, 675-718 (1996).
35. Matis, B. R. et al. Critical role of a nanometer-scale microballoon shell on bulk acoustic properties of doped soft matter. *Langmuir* 36, 5787-5792 (2020).
36. Kinsler, L. E., Frey, A. R., Coppens, A. B., & Sanders, J. V. in *Fundamentals of Acoustics* 3$^{rd}$ edn Ch. 10 (John Wiley & Sons, Inc., 1982).
37. Vollhardt, D. & Wölfle, P. Diagrammatic, self-consistent treatment of the Anderson localization problem in d<2 dimensions. *Phys. Rev. B* 22, 4666 (1980).
38. Skipetrov, S. E. & Sokolov, I. M. Ioffe-Regel criterion for Anderson localization in the model of resonant point scatterers. *Phys. Rev. B* 98, 064207 (2018).
39. Skipetrov, S. E. Localization transition for light scattering by cold atoms in an external magnetic field. *Phys. Rev. Lett.* 121, 093601 (2018).
40. Liu, Q., Feng, X., Zhang, K., An, B., & Duan, Y. Vapor pressure and gaseous speed of sound measurements isobutane (R600a). *Fluid Ph. Equilibria* 382, 260-269 (2014).
41. Wang, S., Zhang, Y., He, M.-G., Zheng, X., & Chen, L.-B. Thermal diffusivity and speed of sound of saturated pentane from light scattering. *Int. J. Thermophys.* 35, 1450-1464 (2014).
42. Kroha, J., Soukoulis, C. M., & Wölfle, P. Localization of classical waves in a random medium: a self-consistent theory. *Phys. Rev. B* 47, 11093 (1993).
43. van Albada, M. P., van Tiggelen, B. A., Lagendijk, A., & Tip, A. Speed of propagation of classical waves in strongly scattering media. *Phys. Rev. Lett.* 66, 3132 (1991).
44. van Tiggelen, B. A., Lagendijk, A., van Albada, M. P., & Tip, A. Speed of light in random media. *Phys. Rev. B* 45, 12233 (1992).
45. Kogan, E., & Kaveh, M. Diffusion constant in a random system near resonance. *Phys. Rev. B* 46, 10636 (1992).
46. Cwilich, G., & Fu, Y. Scattering delay and renormalization of the wave-diffusion constant. *Phys. Rev. B* 46, 12015 (1992).
47. Elattari, B., Kagalovsky, V., & Weidenmüller, H. A. Effect of resonances on diffusive scattering. *Phys. Rev. B* 57, 11258 (1998).
48. Slevin, K. & Ohtsuki, T. Critical exponent for the Anderson transition in the three-dimensional orthogonal universality class. *New J. Phys.* 16, 015012 (2014).
49. Skipetrov, S. E. Finite-size scaling analysis of localization transition for scalar waves in a three-dimensional ensemble of resonant point scatterers. *Phys. Rev. B* 94, 064202 (2016).
50. Skipetrov, S. E. & van Tiggelen, B. A. Dynamics of Anderson localization in open 3D media. *Phys. Rev. Lett.* 96, 043902 (2006).
51. Skipetrov, S. E. & van Tiggelen, B. A. Dynamics of weakly localized waves. *Phys. Rev. Lett.* 92, 113901 (2004).
52. Page, J. H., Schriemer, H. P., Bailey, A. E., & Weitz, D. A. Experimental test of the diffusion approximation for multiply scattered sound. *Phys. Rev. E* 52, 3106-3114 (1995).
53. Rimberg, A. J. & Westervelt, R. M. Temporal fluctuations of multiply scattered light in a random medium. *Phys. Rev. B* 38, 5073-5076 (1988).
54. Stephen, M. J. Temporal fluctuations in wave propagation in random media. *Phys. Rev. B* 37, 1-5 (1988).
55. Mirlin, A. D. Statistics of energy levels and eigenfunctions in disordered systems. *Phys. Rep.* 326, 259-382 (2000).
56. Matis, B. R. et al. Critical role of a nanometer-scale microballoon shell on bulk acoustic properties of doped soft matter. *Langmuir* 36, 5787-5792 (2020).
57. Brekhovskikh, L. M. & Godin, O. A. in *Acoustics of Layered Media* (ed Felsen, L. B.) 17-34 (Spring, 1998).
58. Kuttruff, H. in *Ultrasonics Fundamentals and Applications* 221-222 (Elsevier Applied Science, 1991).
59. Chen, J., Hunter, K. S. & Shandas, R. Wave scattering from encapsulated microbubbles subject to high-frequency ultrasound: contribution of higher-order scattering modes. *J. Acoust. Soc. Am.* 126, 1766-1775 (2009).
60. Tan, L., Pan, J. & Wan, A. Shear and extensional rheology of polyacrylonitrile solution: effect of ultrahigh molecular weight polyacrylonitrile. *Colloid Polym. Sci.* 290, 289-295 (2012).
61. Khismatullin, D. B. & Nadim, A. Radial oscillations of encapsulated microbubbles in viscoelastic liquids. *Phys. Fluids* 14, 3534-3557 (2002).
62. Condat, C. A. & Kirkpatrick, T. R. Observability of acoustical and optical localization. *Phys. Rev. Lett.* 58, 226-229 (1987).
63. Skipetrov, S. E. & Sokolov, I. M. Ioffe-Regel criterion for Anderson localization in the model of resonant point scatterers. *Phys. Rev. B* 98, 064207 (2018).
64. Ioffe, A. F. & Regel, A. R. Non-crystalline, amorphous, and liquid electronic semiconductors. *Prog. Semicond.* 4, 237 (1960).

What is claimed is:

1. An article comprising:
an elastomeric jacket;
a gel within the jacket; and
a plurality of gas-filled, polymerically-encapsulated microbubbles suspended in the gel;
wherein the microbubbles have a Gaussian particle size distribution; and
wherein the largest microbubble has a diameter at least 10 times the diameter of the smallest microbubble.

2. The article of claim 1, wherein the article exhibits Anderson localization at at least one frequency of sound waves impacting the article.

3. The article of claim 1;
wherein the jacket has a jacket bulk modulus and a jacket shear modulus; and
wherein the jacket bulk modulus is at least 100 times the jacket shear modulus.

4. The article of claim 1;
wherein the gel has a gel bulk modulus and a gel shear modulus; and
wherein the gel bulk modulus is at least 100 times the gel shear modulus.

5. The article of claim 1, wherein the jacket and the gel each have acoustic impedances of $1.3 \times 10^6$-$1.7 \times 10^6$ kg sec$^{-1}$ m$^{-2}$ in a range of 0.05-0.8 MHz.

6. The article of claim 1, wherein the jacket has a thickness that prevents deformation of the jacket by the gel.

7. The article of claim 1, wherein the jacket has a thickness that prevents deformation of the jacket when submerged in water up to a depth of 100 m.

8. The article of claim 6, wherein the thickness is 2-6 mm.

9. The article of claim 1, wherein the gel has a smallest dimension of at least 10 mm.

10. The article of claim 1, wherein the article has a volume fraction of the microbubbles of 0.2%-15%.

11. The article of claim 1, wherein the microbubbles have an average diameter of 60-95 μm.

12. The article of claim 1, wherein the Gaussian distribution has a full width at half maximum of 60-80 microns.

13. A method comprising:
submerging the article of claim 1 in water; and
directing or allowing the direction of sound waves having a frequency toward the article.

14. The method of claim 13, wherein the article exhibits Anderson localization at the frequency.

15. The method of claim 13, wherein a portion of the microbubbles exhibit monopole scattering at the frequency.

16. The method of claim 13;
wherein the jacket has a jacket longitudinal wave speed at the frequency and a jacket transverse wave speed at the frequency; and
wherein the jacket longitudinal wave speed is at least ten times the jacket transverse wave speed.

17. The method of claim 13;
wherein the gel has a gel longitudinal wave speed at the frequency and a gel transverse wave speed at the frequency; and
wherein the gel longitudinal wave speed is at least ten times the gel transverse wave speed.

18. The method of claim 13, wherein the jacket has a jacket tan(δ) at the frequency less than 0.5.

19. The method of claim 18, wherein the gel has a gel tan(δ) at the frequency less than or equal to the jacket tan(δ).

20. The method of claim 13;
wherein the gel has a localization length at the frequency; and
wherein the gel has a thickness parallel to the sound waves that is at least three times the localization length.

21. The method of claim 13, wherein the gel has a width perpendicular to the sound waves that is at least 10 times the localization length.

* * * * *